(12) United States Patent
Ueki

(10) Patent No.: US 11,427,312 B2
(45) Date of Patent: Aug. 30, 2022

(54) LANDING GEAR AND STIFFENING MEMBER

(71) Applicant: KAWASAKI JUKOGYO KABUSHIKI KAISHA, Kobe (JP)

(72) Inventor: Yoichi Ueki, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 56 days.

(21) Appl. No.: 17/070,975

(22) Filed: Oct. 15, 2020

(65) Prior Publication Data

US 2021/0024202 A1 Jan. 28, 2021

Related U.S. Application Data

(63) Continuation of application No. PCT/JP2019/016313, filed on Apr. 16, 2019.

(30) Foreign Application Priority Data

Apr. 17, 2018 (JP) .............................. JP2018-079016

(51) Int. Cl.
*B64C 25/52* (2006.01)
*B64C 25/32* (2006.01)

(52) U.S. Cl.
CPC ........ *B64C 25/52* (2013.01); *B64C 2025/325* (2013.01)

(58) Field of Classification Search
CPC ........................... B64C 25/52; B64C 2025/325
See application file for complete search history.

(56) References Cited

U.S. PATENT DOCUMENTS 4,645,143 A * 2/1987 Coffy ...................... B64C 25/52
244/108
5,211,359 A * 5/1993 Rene ....................... B64C 25/52
244/108

(Continued)

FOREIGN PATENT DOCUMENTS

JP S56-79405 U 6/1981
JP H11-49097 A 2/1999
JP 2016-107804 A 6/2016

OTHER PUBLICATIONS

Japan Aeronautical Engineers' Association, "NPTL 1: New Aeronautical Engineering Course "Helicopter"", 5 pages with partial English Translation.

*Primary Examiner* — Tye William Abell
(74) *Attorney, Agent, or Firm* — Xsensus LLP

(57) ABSTRACT

A landing gear includes a pair of skids, a cross tube and a stiffening portion. The pair of skids is arranged in parallel with a front-rear axis of an airframe of a rotary wing aircraft. The cross tube is attached to the airframe and coupling the pair of skids to each other. The cross tube includes curved portions located closer to end portions of the cross tube than to portions of the cross tube attached to the airframe. The stiffening portion suppresses flattening of the cross tube and is arranged in at least one of internal spaces of the curved portions or a stiffened portion located between a pair of curved portions. The stiffening portion includes an enlarged diameter portion which increases in diameter by an axial fastening power acting in an axial direction of the cross tube, and a fastening portion configured to generate the axial fastening power.

18 Claims, 15 Drawing Sheets

(56) References Cited

U.S. PATENT DOCUMENTS

| | | | | |
|---|---|---|---|---|
| 6,244,538 B1* | 6/2001 | Howard | ............ | B64C 25/52 244/108 |
| 2015/0151836 A1* | 6/2015 | Prud'Homme-Lacroix | ............ | B64C 25/52 244/108 |

* cited by examiner

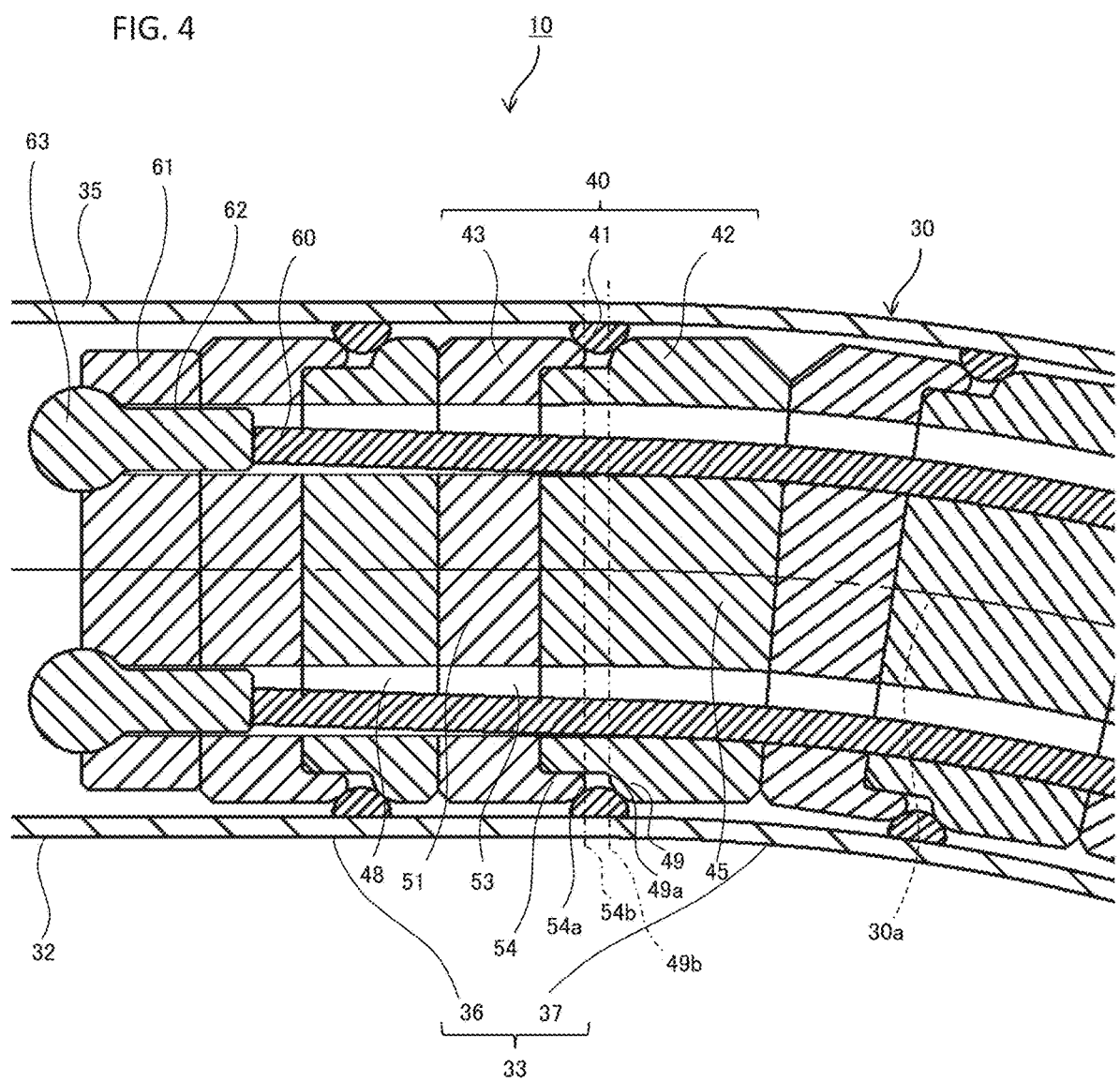

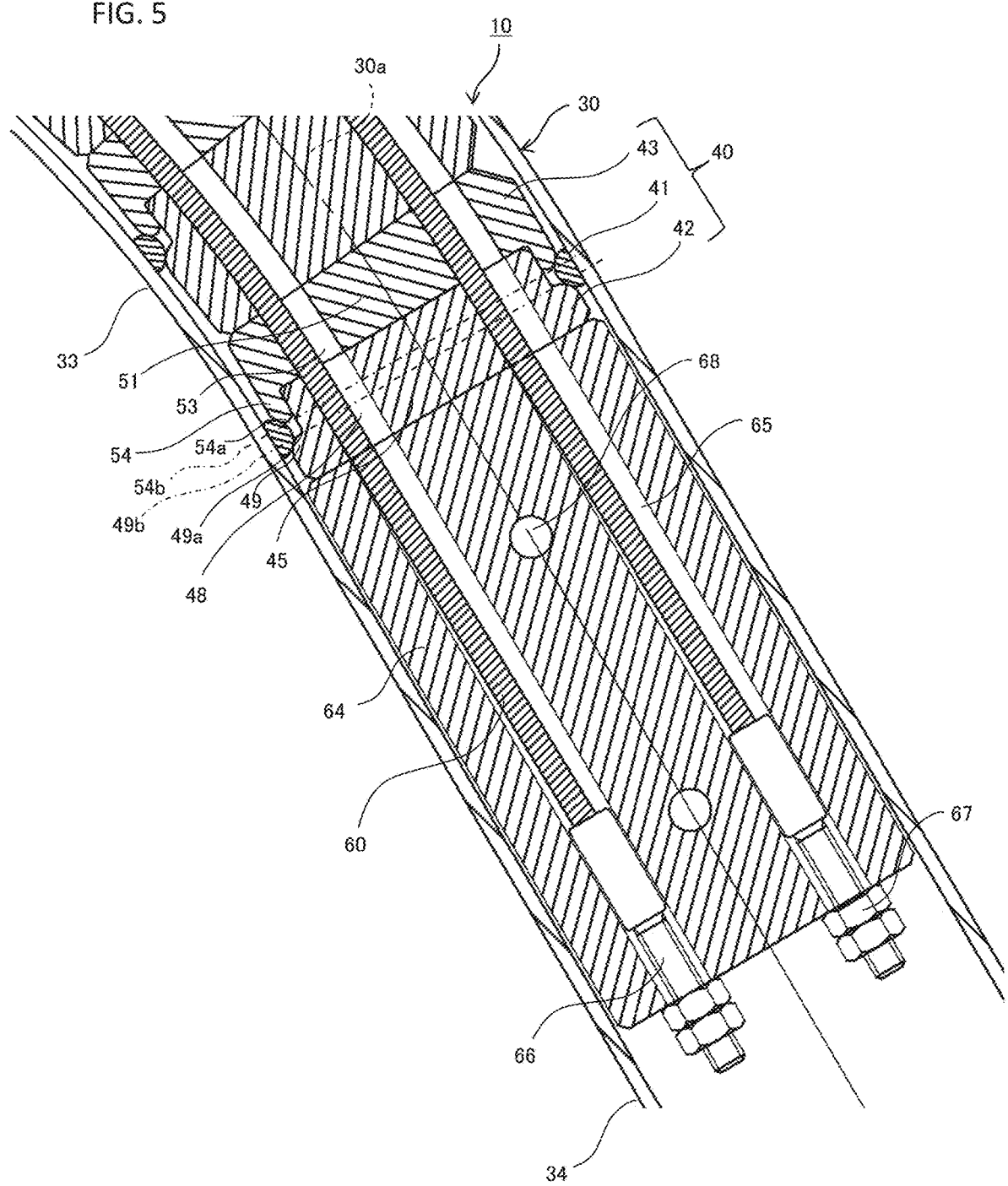

LANDING GEAR AND STIFFENING MEMBER

CROSS-REFERENCE TO RELATED APPLICATIONS

The present application is a bypass continuation of and claims priority to PCT/JP2019/016313, filed on Apr. 16, 2019, which claims priority to JP 2018-079016, filed on Apr. 17, 2018, both of which are incorporated by reference in their entirety.

TECHNICAL FIELD

The present disclosure relates to a landing gear and a stiffening member.

BACKGROUND

Conventionally, a landing gear of a rotary wing aircraft includes a curved portion projecting upward is formed at a skid tube. The skid tube is configured to be able to absorb landing energy. With this, even when the aircraft lands at a high landing speed, large landing energy is absorbed, and therefore, an airframe and crew members are prevented from being damaged.

Another technology used in conventional landing gear is a ground resonance countermeasure. In particular, ground resonance is avoided by adding a damper between the landing gear and the airframe.

It is necessary that landing gear absorb a large landing energy while a ground resonance is avoided. Although these are requirements that conflict with each other, it is required that landing gear satisfy these requirements simultaneously.

SUMMARY

A landing gear according to an aspect of the present disclosure includes a pair of skids, a cross tube and a stiffening portion. The pair of skids is arranged in parallel with a front-rear axis of an airframe of a rotary wing aircraft. The cross tube is attached to the airframe and coupling the pair of skids to each other. The cross tube includes curved portions located closer to end portions of the cross tube than to portions of the cross tube attached to the airframe. The stiffening portion suppresses flattening of the cross tube and is arranged in at least one of internal spaces of the curved portions or a stiffened portion located between a pair of curved portions. The stiffening portion includes an enlarged diameter portion which increases in diameter by an axial fastening power acting in an axial direction of the cross tube, and a fastening portion configured to generate the axial fastening power.

BRIEF DESCRIPTION OF THE DRAWINGS

FIG. 4 is a cross-sectional view showing one end portion of the side portion shown in FIG. 3.

FIG. 5 is a cross-sectional view showing the other end portion of the side portion shown in FIG. 3.

DETAILED DESCRIPTION OF THE DRAWINGS

Figure 1:
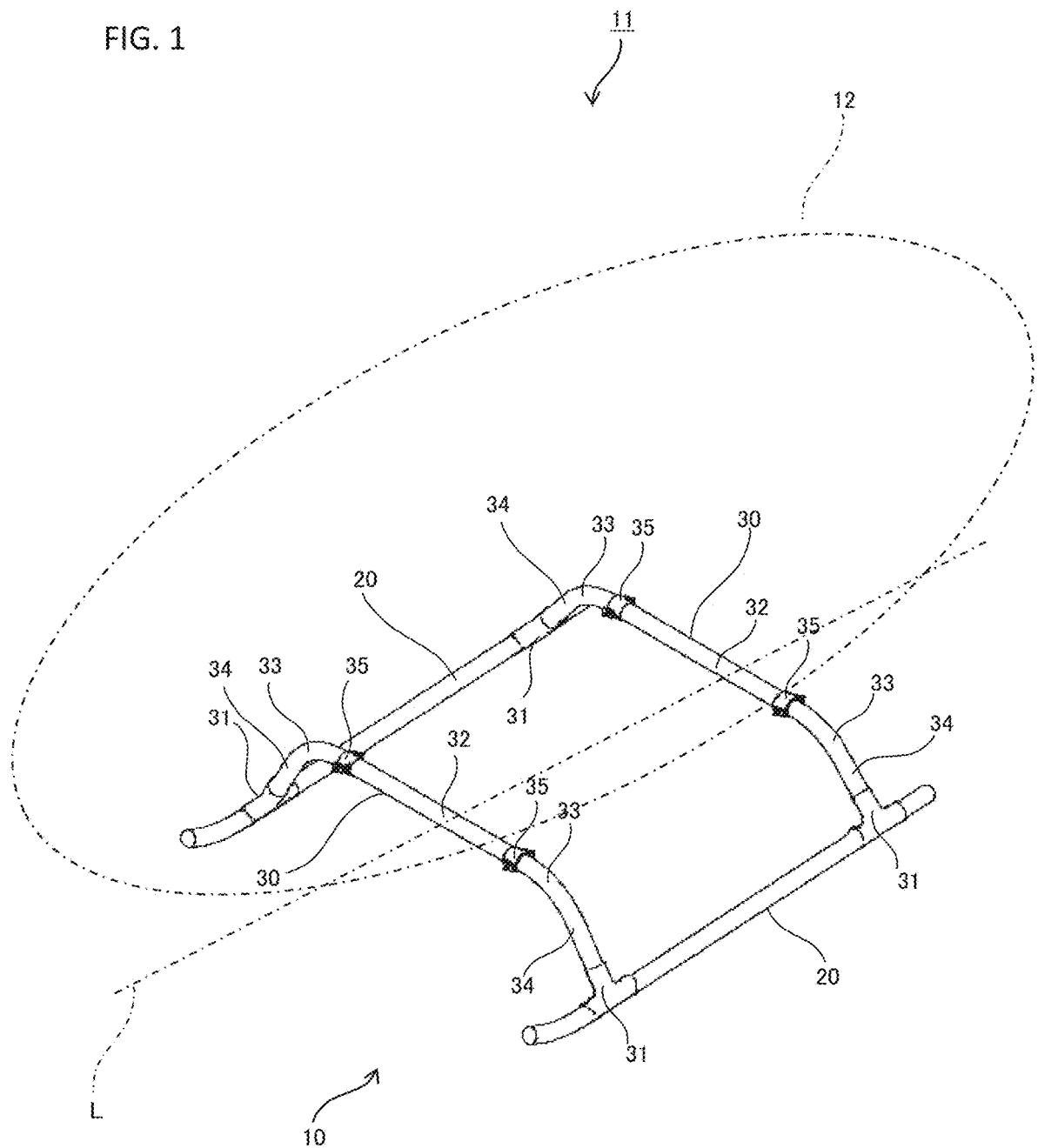
FIG. 1 is a perspective view schematically showing a landing gear according to the present disclosure.
Figure 2:
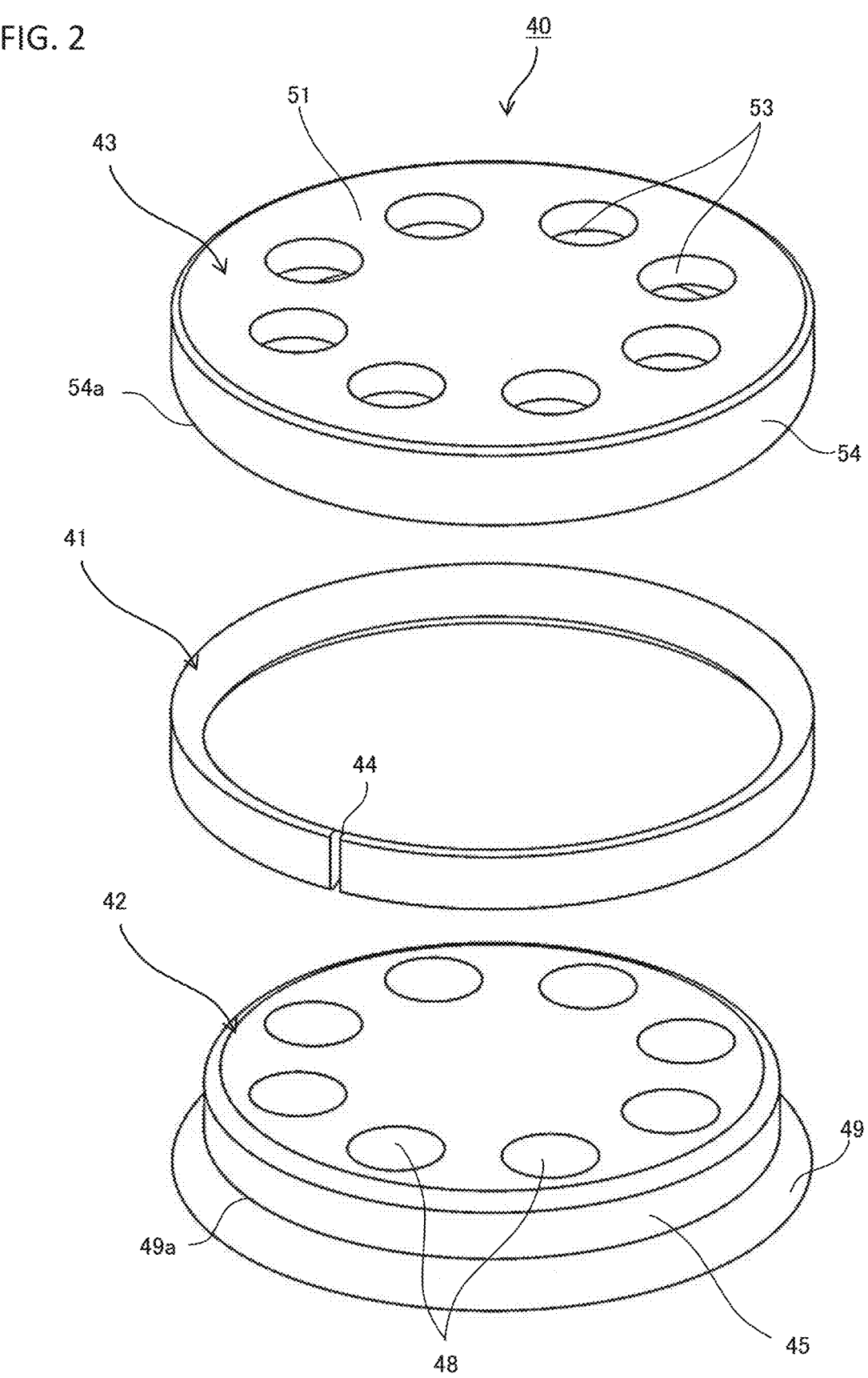
FIG. 2 is an exploded perspective view showing a stiffening portion arranged at a cross tube shown in FIG. 1.

A landing gear according to the present disclosure includes a pair of skids arranged in parallel with a front-rear axis of an airframe of a rotary wing aircraft. The landing gear further includes a cross tube, attached to the airframe and coupling the pair of skids to each other. The landing gear further includes and a stiffening portion configured to suppress flattening of the cross tube. The cross tube includes an internal space and curved pipe parts located closer to corresponding end portions of the cross tube than corresponding attached portions of the cross tube, the attached portions being attached to the airframe. The stiffening portion is arranged in at least one of internal spaces of pipe parts that are the curved pipe parts and a pipe part located between the pair of curved pipe parts.

According to this configuration, the stiffening portion arranged in the pipe part suppresses flattening of the cross tube. The rigidity of the cross tube is increased to a value by the positions of the stiffening portions in the cross tube, the number of stiffening portions, and contact states of the stiffening portions with the inner surface of the cross tube. Therefore, the ground resonance can be avoided. Moreover, even at the time of the landing at a high landing speed, large landing energy can be absorbed by preventing buckling and collapsing of the cross tube.

In this landing gear, the stiffening portion and an inner surface of the pipe part may be in contact with each other in a no-load state. According to this configuration, the stiffening portion supports the pipe part from an inside to suppress flattening of the cross tube. Therefore, the ground resonance can be avoided by increasing the rigidity of the cross tube, and the large landing energy can be absorbed by preventing the cross tube from buckling.

In this landing gear, the stiffening portion may be arranged such that a gap is formed between the stiffening portion and an inner surface of the pipe part in a no-load state. The gap may be set such that when the inner surface of the pipe part flattened by a load at the time of landing is brought into contact with the stiffening portion, an inflection point of a curve showing a relation between the load and displacement of the attached portion is formed at displacement smaller than displacement when the pipe part buckles.

According to this configuration, the stiffening portion supports the pipe part from an inside to suppress flattening of the cross tube. Therefore, the ground resonance can be avoided by increasing the rigidity of the cross tube, and the large landing energy can be absorbed by preventing the cross tube from buckling.

In this landing gear, the gap may be set such that the inflection point is formed at the displacement included in an elastic deformation position of the pipe part. According to this configuration, the ground resonance can be avoided, and the absorbed landing energy can be increased.

In this landing gear, the stiffening portion may include a ring, a first disc, a second disc, and a wire. The ring is capable of increasing in diameter and configured to increase in diameter to be brought into contact with an inner surface of the pipe part. The first disc and the second disc are internally fitted to the ring and configured to sandwich the ring in an axial direction. The wire is configured to generate axial fastening power with respect to the first disc and the second disc. The first disc may include a first engaging portion which is brought into contact with the ring to restrict the displacement of the ring toward one side in the axial direction and increase the diameter of the ring. The second disc may include a second engaging portion which is brought into contact with the ring to restrict the displacement of the ring toward the other side in the axial direction and increase the diameter of the ring.

According to this configuration, the stiffening portions can be attached to the cross tubes of existing landing gears. Moreover, by the friction among the ring, the first disc, and the second disc, the friction between the wire and each of the first disc and the second disc, and the friction between the ring and the inner surface of the pipe part, the vibration can be attenuated, and the ground resonance can be reduced.

In this landing gear, the second engaging portion may include a projection which is fitted in a gap between an outer side surface of the first disc and an inner peripheral surface of the ring to increase the diameter of the ring. According to this configuration, radially internal force is generated among the cross tube, the ring, the first disc, and the second disc, and the stiffening portion can be fixed to the cross tube by frictional force generated by the internal force.

A stiffening member according to another aspect is a stiffening member for use in a landing gear. The landing gear includes a pair of skids arranged in parallel with a front-rear axis of an airframe of a rotary wing aircraft, and a cross tube attached to the airframe and coupling the pair of skids to each other. The cross tube includes an internal space. The stiffening member is arranged in at least one of internal spaces of pipe parts that are curved pipe parts and a pipe part located between the pair of curved pipe parts, the curved pipe parts being located closer to corresponding end portions of the cross tube than corresponding attached portions of the cross tube, the attached portions being attached to the airframe. The stiffening member includes a ring, a first disc, a second disc, and a wire. The ring is capable of increasing in diameter and configured to increase in diameter to be brought into contact with an inner surface of the pipe part. The first disc and the second disc internally fitted to the ring and configured to sandwich the ring in an axial direction.

The wire is configured to generate axial fastening power with respect to the first disc and the second disc. The first disc includes a first engaging portion which is brought into contact with the ring to restrict the displacement of the ring toward one side in the axial direction and increase the diameter of the ring. The second disc includes a second engaging portion which is brought into contact with the ring to restrict the displacement of the ring toward the other side in the axial direction and increase the diameter of the ring.

According to this configuration, the stiffening members can be attached to the cross tubes of existing landing gears. Moreover, the number of fastened positions for the stiffening member is smaller than that for the other stiffening device whose main object is to increase the second moment of area. Therefore, attaching and fixing of the stiffening members to the cross tube are easy. Moreover, by the stiffening member, the ground resonance can be avoided by increasing the rigidity of the cross tube, and the large landing energy can be absorbed by preventing the cross tube from buckling. Furthermore, by the friction among the ring, the first disc, and the second disc, the friction between the wire and each of the first disc and the second disc, and the friction between the ring and the inner surface of the pipe part, the vibration can be attenuated, and the ground resonance can be reduced.

Hereinafter, embodiments will be specifically described with reference to the drawings. In the following description and the drawings, the same reference signs are used for the same or corresponding components, and a repetition of the same explanation is avoided.

Embodiment 1

Configuration of Landing Gear

Figure 3:
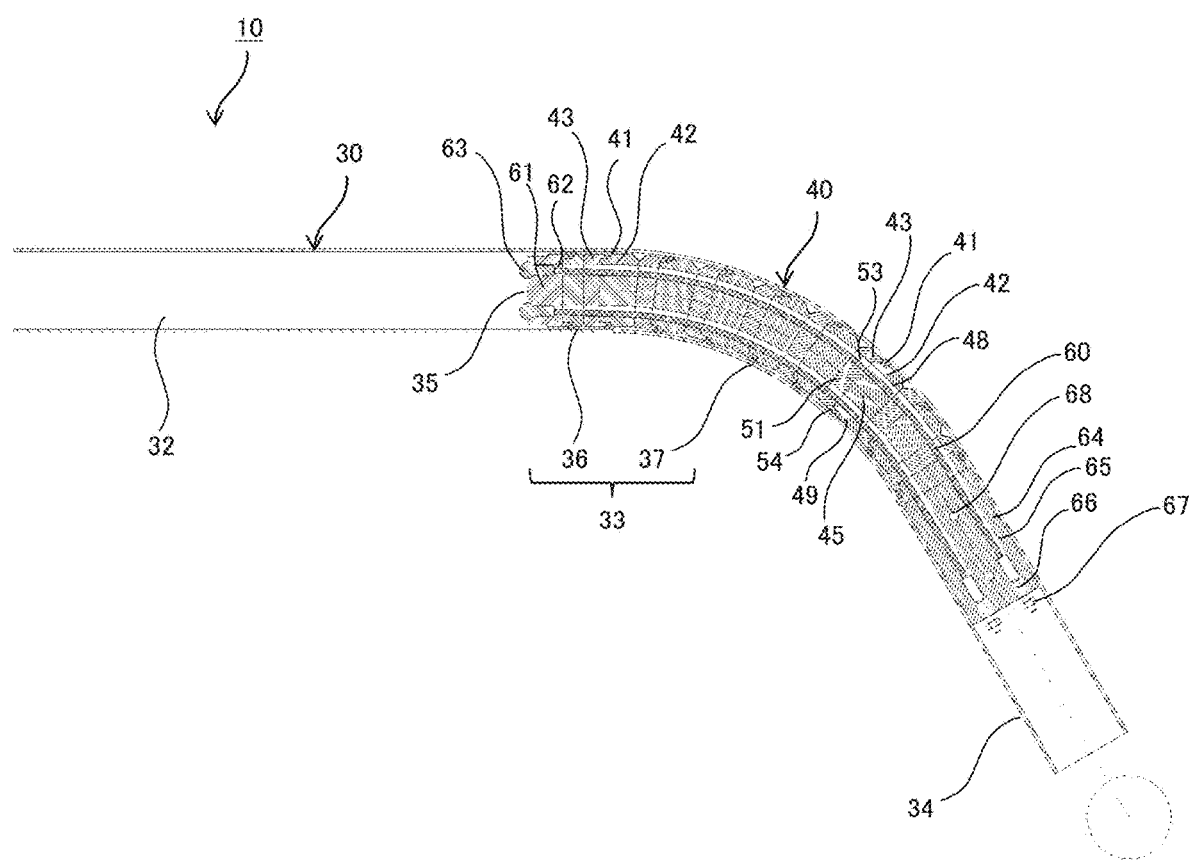
FIG. 3 is a cross-sectional view showing the landing gear in which the stiffening portion shown in FIG. 2 is arranged at a side portion.

As shown in FIGS. 1 and 3, a landing gear 10 according to Embodiment 1 is attached to an airframe 12 of a rotary wing aircraft 11 and is used when the rotary wing aircraft 11 lands. The following will describe a case where the landing gear 10 is applied to a helicopter. However, the rotary wing aircraft 11 is not limited to the helicopter, and the landing gear 10 is also applicable to other aircrafts, such as drones. It should be noted that when viewed from the landing gear 10 of the rotary wing aircraft 11, a side toward the airframe 12 is referred to as an "upper side" and its opposite side is referred to as a "lower side." However, the directions of the rotary wing aircraft 11 are not limited to these.

The landing gear 10 includes a pair of skids 20 and a pair of cross tubes 30. The pair of cross tubes 30 couple the pair of skids 20 to each other. The pair of skids 20 are portions which contact with the ground when the rotary wing aircraft 11 lands. The pair of skids 20 are provided in parallel with a front-rear axis L of the airframe 12 of the rotary wing aircraft 11 and are arranged so as to be spaced apart from each other. The skids 20 are tubular members, and front portions of the skids 20 are inclined so as to extend upward as the front portions extend forward. It should be noted that the front portions of the skids 20 do not have to be inclined.

The pair of cross tubes 30 are portions which absorb energy (landing energy) generated when the skids 20 contact with the ground, and reduce impact on the airframe 12. The pair of cross tubes 30 are provided between the airframe 12 and the pair of skids 20. The pair of cross tubes 30 are provided perpendicular to the front-rear axis L of the airframe 12 of the rotary wing aircraft 11 and are arranged so as to be spaced apart from each other. One of both end portions 31 of each of the pair of cross tubes 30 is connected to one of the pair of skids, and the other of the end portions 31 is connected to one end of the other skid 20.

Each of the cross tubes 30 is, for example, a tubular member including an internal space. An outer diameter of the cross tube 30 is constant in an axial direction. A thickness of the cross tube 30 is constant in the axial direction and a circumferential direction. Moreover, the cross tube 30 has a known shape and is produced by, for example, bending a circular pipe. Stiffening portions 40 are arranged in the internal space of the cross tube 30. The stiffening portions 40 will be described later.

The cross tube 30 includes, for example, a middle portion 32, a pair of side portions 33, a pair of extending portions 34, a pair of attached portions 35, and a pair of end portions 31. The pair of side portions 33, the pair of extending portions 34, the pair of attached portions 35, and the pair of end portions 31 are arranged mirror-symmetrically about the middle portion 32.

The middle portion 32 is a portion which curves so as to be bent by external force, such as a landing load. The middle portion 32 is provided between the pair of attached portions 35 and at a middle of the cross tube 30. The middle portion 32 is arranged in parallel with a plane including the pair of skids 20. The side portion 33 is located closer to the end portion 31 than the attached portion 35 and is provided between the middle portion 32 and the extending portion 34. The side portion 33 is inclined so as to curve downward relative to the middle portion 32 and is coupled to the extending portion 34. The extending portion 34 is provided between the side portion 33 and the end portion 31. The extending portion 34 is located outside the side portion 33 and is inclined relative to the middle portion 32 so as to linearly extend downward toward the end portion 31.

The cross tube 30 is constituted by linear pipe parts extending linearly and curved pipe parts that curve in a substantially circular-arc shape. In the present embodiment, the middle portion 32 and the extending portion 34 are formed by the linear pipe parts, and the side portion 33 is formed by a linear pipe part 36 and a curved pipe part 37. The linear pipe part 36 is provided closer to the middle portion 32 than the curved pipe part 37. The linear pipe part 36 and the middle portion 32 sandwich the attached portion 35 and are lined up to form a single continuous straight line. It should be noted that the side portion 33 may not include the linear pipe part 36. i.e., may be formed by the curved pipe part 37.

The attached portion 35 is a portion attached to the airframe 12. The cross tube 30 supports the airframe 12 by the attached portions 35. The pair of attached portions 35 are provided at one cross tube 30. With this, the airframe 12 is supported by the landing gear 10 at four points of the pair of cross tubes 30.

The attached portions 35 of the cross tube 30 transmit force to the airframe 12, the force acting in three translational directions along the front-rear axis L of the airframe 12 and two axes perpendicular to the front-rear axis L. Moreover, the attached portions 35 do not restrict rotation about the front-rear axis L and do not transmit a moment about the front-rear axis L to the airframe 12. Therefore, it can be said that the cross tube 30 is equivalent to a four-point bent beam model.

In this four-point bent beam model, a bending moment is maximum and constant at the middle portion 32 located between the pair of attached portions 35. Therefore, the landing energy is absorbed mainly by plastic bending of the middle portion 32 at which the bending moment becomes maximum. Moreover, the cross tube 30 corresponding to the four-point bent beam model can have a large plastic region (volume), and therefore, the absorbability of the cross tube 30 that absorbs the landing energy is excellent For example, according to landing gears of conventional art, skids and cross tubes elastically deform to absorb the landing energy. In this case, since most of the absorbed energy is released without being consumed by the elastic deformation, the absorbed energy becomes large repulsive force with respect to the ground surface. With this, the airframe attached to the landing gear may rebound upward.

On the other hand, the plastic deformation of the cross tube 30 can consume a larger amount of landing energy than the elastic deformation. In addition, since the plastic region is large, the landing energy can be consumed more efficiently. Therefore, safety at the time of the landing can be improved.

It should be noted that flexural rigidity (EI) of the cross tube 30 is constant regardless of cross sections. Here, E denotes the modulus of longitudinal elasticity, and I denotes the second moment of area. Rigidity related to ground resonance is determined by the flexural rigidity of the entire cross tube 30.

Configuration of Stiffening Portion

As shown in FIGS. 2 to 5, the stiffening portions 40 are stiffening members which are arranged in the cross tube 30 and suppress flattening of the cross tube 30. Each of the stiffening portions 40 includes an enlarged diameter portion and a fastening portion. In the cross tube 30, the stiffening portion 40 is arranged in at least one of internal spaces of pipe parts that are the curved pipe parts 37 and a pipe part located between the pair of curved pipe parts 37. In the present embodiment, the stiffening portions 40 are arranged at the curved pipe parts 37 of the side portions 33 and the linear pipe parts 36 located between the pair of curved pipe parts 37. It should be noted that the stiffening portions 40 may not be arranged at the linear pipe parts 36 and may be arranged at the curved pipe parts 37. Or, the stiffening portions 40 may be arranged at the linear pipe parts 36 and may not be arranged at the curved pipe parts 37.

The enlarged diameter portion is a portion which increases in diameter by axial fastening power of the fastening portion. The enlarged diameter portion includes a ring 41, a first disc 42, and a second disc 43. The first disc 42 and the second disc 43 are internally fitted to the ring 41 and sandwiches the ring 41 in an axial direction. The ring 41, the first disc 42, and the second disc 43 are made of a material, such as metal, having rigidity. It should be noted that when viewed from the first disc 42, a side toward the second disc 43 is referred to as an upper side, and its opposite side is referred to as a lower side. However, directions in which the stiffening portion 40 is arranged are not limited to these.

The ring 41 has an annular shape, and a cut portion 44 is provided at part of the ring 41 in a circumferential direction. An interval between one of circumferential ends of the ring 41 and the other circumferential end of the ring 41 widens by the cut portion 44. Thus, the ring 41 can increase in diameter. Moreover, the ring 41 has a semi-circular cross section passing through a central axis of the ring 41. A circular-arc curved surface of the semi-circular shape constitutes an inner peripheral surface of the ring 41, and a flat surface of the semi-circular shape constitutes an outer peripheral surface of the ring 41.

The first disc 42 includes a columnar main body 45, holes (first through holes 48), and an engaging portion (first engaging portion 49). The first through holes 48 and the first engaging portion 49 are provided at the main body 45. The main body 45 includes a circular upper surface (first upper surface), a circular lower surface (first lower surface), and a side surface (first side surface). The first side surface connects an outer peripheral edge of the first upper surface and an outer peripheral edge of the first lower surface.

The main body 45 has such a shape that the first upper surface and the first lower surface are perpendicular to a central axis 30a of the cross tube 30, and the first side surface is parallel to or substantially parallel to the central axis 30a of the cross tube 30. Therefore, in the linear pipe part 36 of the cross tube 30, the main body 45 is provided such that the first upper surface and the first lower surface are parallel to each other, and the first side surface is perpendicular to the first upper surface and the first lower surface. On the other hand, in the curved pipe part 37 of the cross tube 30, the main body 45 is provided such that the first lower surface is inclined relative to the first upper surface, and the first side surface is inclined relative to the first upper surface and the first lower surface.

One or more (in the present embodiment, eight) first through holes 48 are provided at the main body 45. These first through holes 48 are arranged at regular intervals in the circumferential direction at the main body 45. The first through holes 48 are holes through which wires 60 pass when the stiffening portion 40 is attached to the side portion 33. The first through holes 48 penetrate the main body 45 along a central axis of the main body 45 so as to extend between the first upper surface and the first lower surface.

The first engaging portion 49 is provided at one end (in the present embodiment, a lower end) of the main body 45. The first engaging portion 49 has a ring shape. The first engaging portion 49 projects from the first side surface of the main body 45 outward so as to increase in diameter. An outer diameter of the first engaging portion 49 is smaller than an inner diameter of the cross tube 30. An upper surface of the first engaging portion 49 is formed by an inclined surface that increases in diameter downward so as to correspond to the inner peripheral surface of the ring 41. A lower surface of the first engaging portion 49 is formed by a flat surface so as to be flush with the first lower surface of the main body 45. The first engaging portion 49 is formed such that a virtual plane 49b formed by an upper end 49a of the first engaging portion 49 is perpendicular to the central axis 30a of the cross tube 30.

The second disc 43 includes a cylindrical engaging portion (second engaging portion 54) and a disc-shaped flat surface portion 51. A base end of the second engaging portion 54 is connected to the flat surface portion 51 such that one of openings of the second engaging portion 54 is closed. The other opening of the second engaging portion 54 is open. A tip end 54a of the second engaging portion 54 surrounds a periphery of the other opening and is formed by an inclined surface that decreases in diameter downward so as to correspond to the inner peripheral surface of the ring 41.

An inner diameter of the second engaging portion 54 is set to be slightly larger than an outer diameter of the main body 45 such that: the main body 45 of the first disc 42 is inserted into the second engaging portion 54; and an inner side surface of the second engaging portion 54 is brought into contact with the first side surface of the main body 45. An outer diameter of the second engaging portion 54 is set to be equal to the diameter of the first engaging portion 49 of the first disc 42.

The second engaging portion 54 has such a shape that: the flat surface portion 51 and a virtual plane 54b formed by the tip end 54a are perpendicular to the central axis 30a of the cross tube 30; and an outer side surface of the second engaging portion 54 is parallel to the central axis 30a of the cross tube 30. Therefore, in the linear pipe part 36 of the cross tube 30, the second engaging portion 54 is provided such that the flat surface portion 51 and the virtual plane 54b are parallel to each other, and the outer side surface of the second engaging portion 54 is perpendicular to the flat surface portion 51 and the virtual plane 54b. On the other hand, in the curved pipe part 37 of the cross tube 30, the second engaging portion 54 is provided such that the virtual plane 54b is inclined relative to the flat surface portion 51, and the outer side surface of the second engaging portion 54 is inclined relative to the flat surface portion 51 and the virtual plane 54b.

One or more (in the present embodiment, eight) holes (second through holes 53) are provided at the flat surface portion 51. These second through holes 53 are arranged at regular intervals in the circumferential direction at the flat surface portion 51. The second through holes 53 are holes through which the wires 60 pass when the stiffening portion 40 is attached to the side portion 33. The second through holes 53 penetrate the flat surface portion 51 so as to extend between an upper surface (second upper surface) of the flat surface portion 51 and a lower surface (second lower surface) of the flat surface portion 51. The second through holes 53 are arranged such that when the second disc 43 is arranged in the side portion 33 so as to sandwich the ring 41 together with the first disc 42, the wires 60 having passed through the first through holes 48 pass through the second through holes 53.

The fastening portion is a member configured to generate axial fastening power with respect to the enlarged diameter portion. The fastening portion includes the wires 60, a first support tool 61, and a second support tool 64. As shown in FIG. 3, for example, a first terminal fitting 63 having a spherical shape is attached to one end of each wire 60, and a second terminal fitting 66 including a screw portion is attached to the other end of each wire 60. However, the shapes of the ends of the wires 60 are not limited to these as long as the stiffening portion 40 can be fixed to the cross tube 30.

The first support tool 61 has, for example, a disc shape and includes first insertion holes 62 penetrating the first support tool 61 in a thickness direction of the first support tool 61. The first insertion holes 62 are provided at positions corresponding to the second through holes 53 of the stiffening portion 40. An inner diameter of each first insertion hole 62 is larger than the diameter of the wire 60 and smaller than the diameter of the first terminal fitting 63.

The second support tool 64 has, for example, a columnar shape and includes second insertion holes 65 penetrating the second support tool 64 in an axial direction of the second support tool 64. The second insertion holes 65 are provided at positions corresponding to the first through holes 48 of the stiffening portion 40. An inner diameter of the second insertion holes 65 is larger than the diameter of the wire 60 and the diameter of the second terminal fitting 66 and smaller than the diameter of a nut 67 attached to the second terminal fitting 66. The second support tool 64 further includes third through holes 68 penetrating the second support tool 64 in a radial direction of the second support tool 64.

Method of Attaching Stiffening Portion

First, as shown in FIG. 4, the wires 60 are made to pass through the first insertion holes 62 of the first support tool 61. With this, the first terminal fittings 63 of the wires 60 are locked to one surface of the first support tool 61, and thus, the wires 60 are fixed to the first support tool 61. The first support tool 61 is inserted into the cross tube 30 from the one surface side.

Next, the wires 60 are made to pass through the second through holes 53 such that the second upper surface of the flat surface portion 51 of the second disc 43 of the stiffening portion 40 is brought into contact with the other surface of the first support tool 61. Then, the second disc 43 is inserted into the cross tube 30. With this, the tip end 54a of the second engaging portion 54 projects toward an opposite side of the first support tool 61.

Then, the ring 41 is inserted into the cross tube 30, and then, the first disc 42 is inserted into the cross tube 30 such that the first upper surface is opposed to the second lower surface of the flat surface portion 51. With this, the ring 41 is sandwiched between the first disc 42 and the second disc 43, and the stiffening portion 40 is arranged in the cross tube 30.

A plurality of stiffening portions 40 are inserted into the cross tube 30 in the same manner as above and are arranged in the side portion 33 of the cross tube 30. Then, as shown in FIG. 5, the second support tool 64 is brought into contact with the first lower surface of the first disc 42 of the stiffening portion 40 located closest to the end portion 31, and the wires 60 are made to pass through the second insertion holes 65 of the second support tool 64.

Then, the nuts 67 are attached to the second terminal fittings 66 of the wires 60 projecting from the second insertion holes 65. The nuts 67 are locked to the second support tool 64, and thus, the wires 60 are fixed to the second support tool 64. Moreover, bolts are fastened to the third through holes 68 of the second support tool 64. With this, the second support tool 64 and the stiffening portions 40 are fixed to the side portion 33.

Figure 6A:
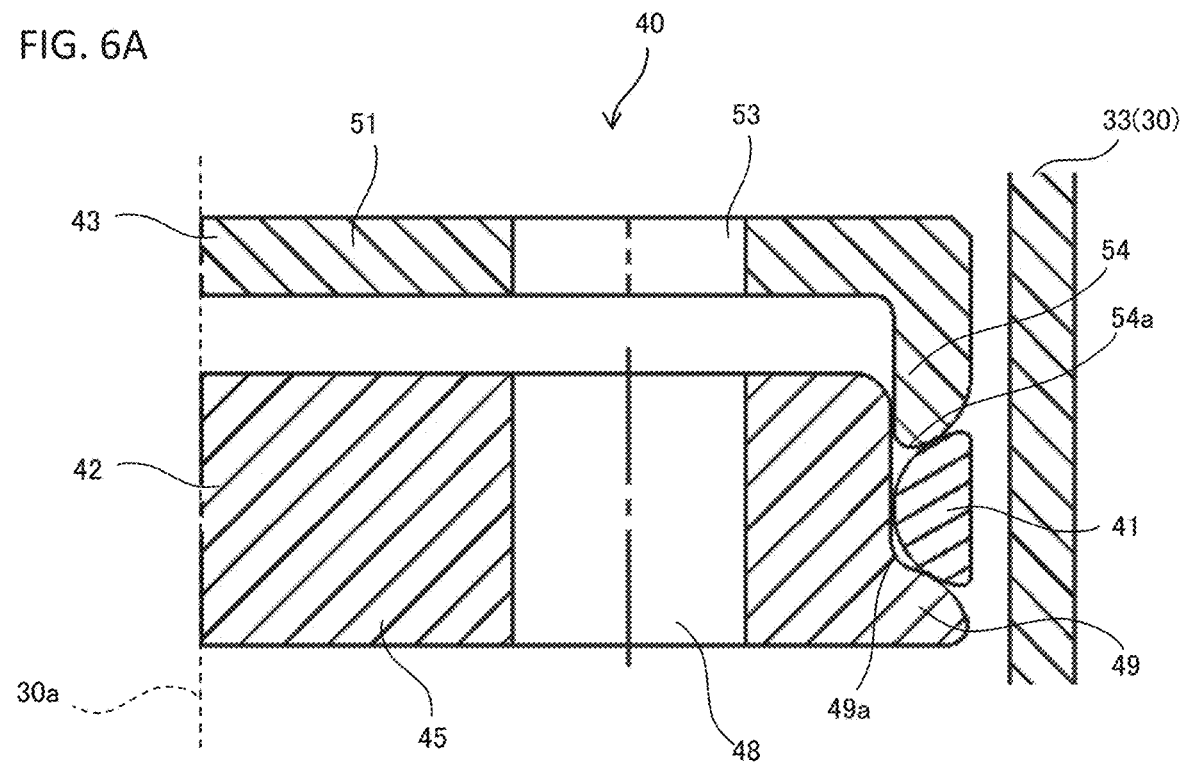
FIGS. 6A and 6B are cross-sectional views for explaining a method of attaching the stiffening portion shown in FIG. 2.
Figure 6B:
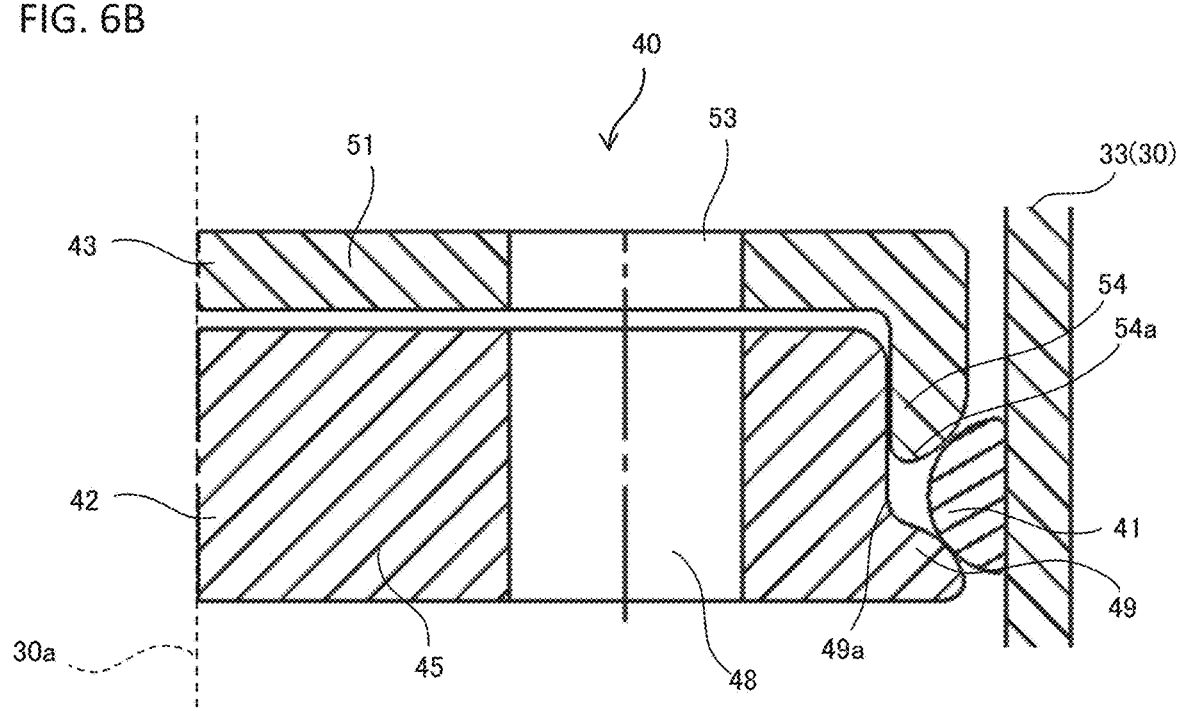

In this case, when the nuts 67 are fastened to the second terminal fittings 66, the wires 60 generate, at the enlarged diameter portion, force (axial fastening power) which reduces a distance between the first support tool 61 and the second support tool 64. Therefore, as shown in FIG. 6A, the main body 45 of the first disc 42 is fitted in the ring 41, and the ring 41 is sandwiched between the first engaging portion 49 of the first disc 42 and the second engaging portion 54 of the second disc 43 in the axial direction. Then, as shown in FIG. 6B, when the wires 60 are fastened, the main body 45 is fitted in the second engaging portion 54, and the first upper surface is brought into contact with the second lower surface.

Since the ring 41 is brought into contact with the first engaging portion 49, the displacement of the ring 41 toward one side (i.e., downward) in the axial direction is restricted. Then, the tip end 54a of the second engaging portion 54 is inserted between the ring 41 and the main body 45, and therefore, the ring 41 increases in diameter. As above, the axial fastening power generated by the fastening portion is replaced with a load acting in the radial direction perpendicular to the axial direction. With this, the ring 41 is brought into contact with the second engaging portion 54, and therefore, the displacement of the ring 41 toward the other side (i.e., upward) in the axial direction is restricted. The outer peripheral surface of the ring 41 is brought into contact with an inner surface of the cross tube 30. Thus, the stiffening portion 40 is fixed to the cross tube 30. It should be noted that FIGS. 6A and 6B show part of the stiffening portion 40 and part of the cross tube 30, and the other parts are omitted. Moreover, in FIGS. 6A and 6B, the cross tube 30 having a linear pipe shape is shown, but the same is true even when the cross tube 30 has a curved pipe shape.

As above, the stiffening portion 40 can be attached to the cross tube 30 of the existing landing gear 10. Therefore, a significant design change of the landing gear 10 is not required. Moreover, the number of fastened positions for the attachment of the stiffening portions 40 is smaller than that for the other stiffening device whose main object is to increase the second moment of area. Therefore, attaching and fixing of the stiffening portions 40 to the cross tube 30 are easy.

When a landing load or the like is not applied to the cross tube 30 (no-load state), and the cross tube 30 is not flattened, the ring 41 of the stiffening portion 40 is in contact with the inner surface of the cross tube 30. Therefore, even when the impact generated at the time of the landing of the landing gear 10 acts on the cross tube 30, the vibration of the cross tube 30 by the impact can be reduced by the friction between the ring 41 and the cross tube 30 which are in contact with each other. Therefore, the ground resonance of the landing gear 10 by the vibration can be suppressed.

The landing load acts on the cross tube 30, the ring 41 of the stiffening portion 40, the first and second discs 42 and 43, and the wires 60 in this order. At this time, the wires 60 change their tension. Then, by the friction among the ring 41, the first disc 42, and the second disc 43 in the stiffening portion 40, the friction between the wire 60 and each of the first disc 42 and the second disc 43, and the friction between the ring 41 and the inner surface of the pipe part of the cross tube 30, the vibration can be attenuated, and in addition, the ground resonance can be reduced.

Characteristics of Landing Gear

Figure 7A:
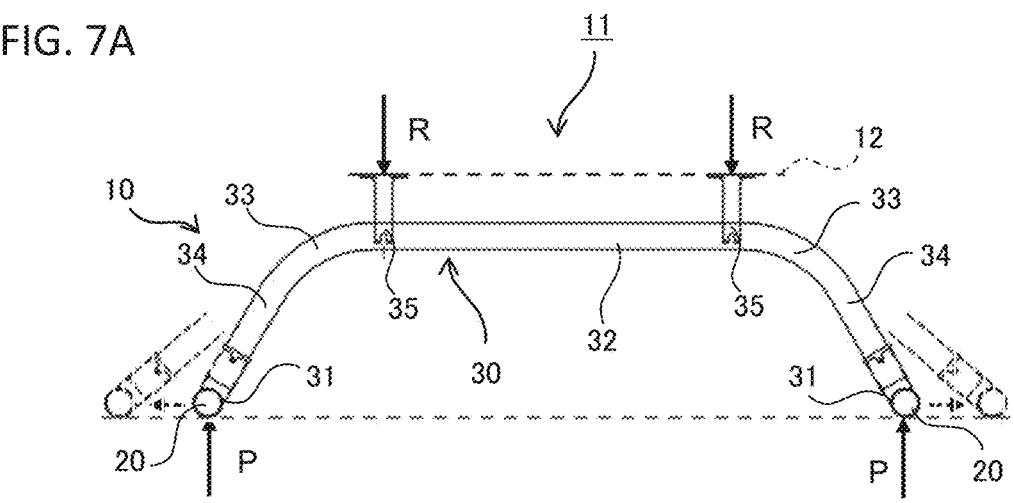
FIGS. 7A to 7C are diagrams for explaining the deformation of the cross tube shown in FIG. 1.

As shown in FIGS. 1 and 7A, when the rotary wing aircraft 11 lands, the skids 20 of the landing gear 10 contact with the ground. With this, an upward load (landing load) P acts on each of the end portions 31 of the cross tubes 30 connected to the skids 20.

Figure 7B:
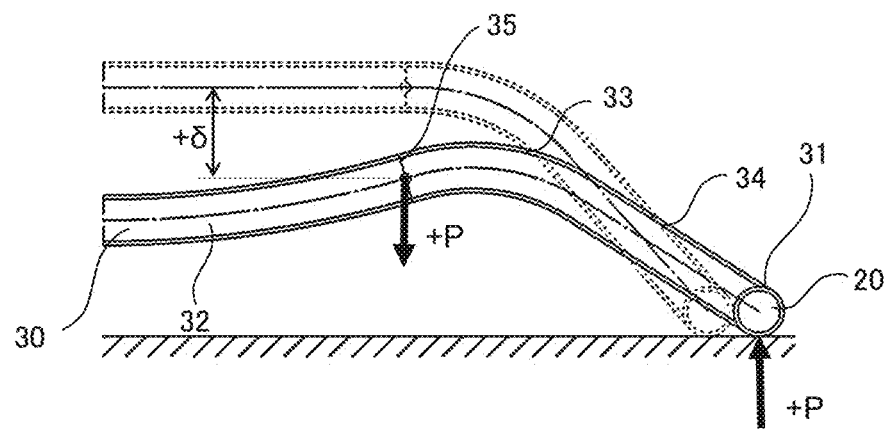

Accordingly, as shown in FIG. 7B, the load P acts on each of the attached portions 35 of the airframe 12 in a direction opposite to a direction in which the load P acts on each of the end portions 31. By the load P acting on each of the attached portions 35, the cross sections of the middle portion 32 and side portions 33 of the cross tube 30 deform to become an oval shape, and thus, the middle portion 32 and side portions 33 of the cross tube 30 are flattened. In addition to this, the middle portion 32 is bent so as to curve downward while the side portions 33 deform such that an interval between the pair of end portions 31 increases. With this, each attached portion 35 moves downward by displacement δ.

Figure 7C:
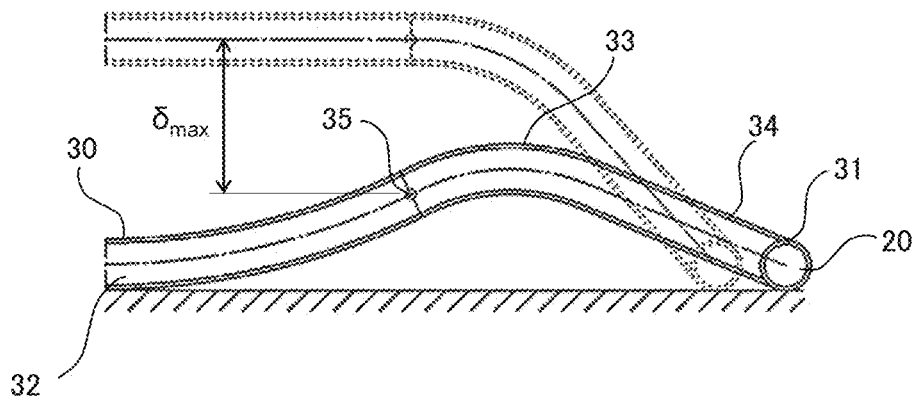

For example, as shown in FIG. 7C, when the attached portion 35 moves by maximum displacement δ max, the middle portion 32 is brought into contact with the ground.

Figure 8:
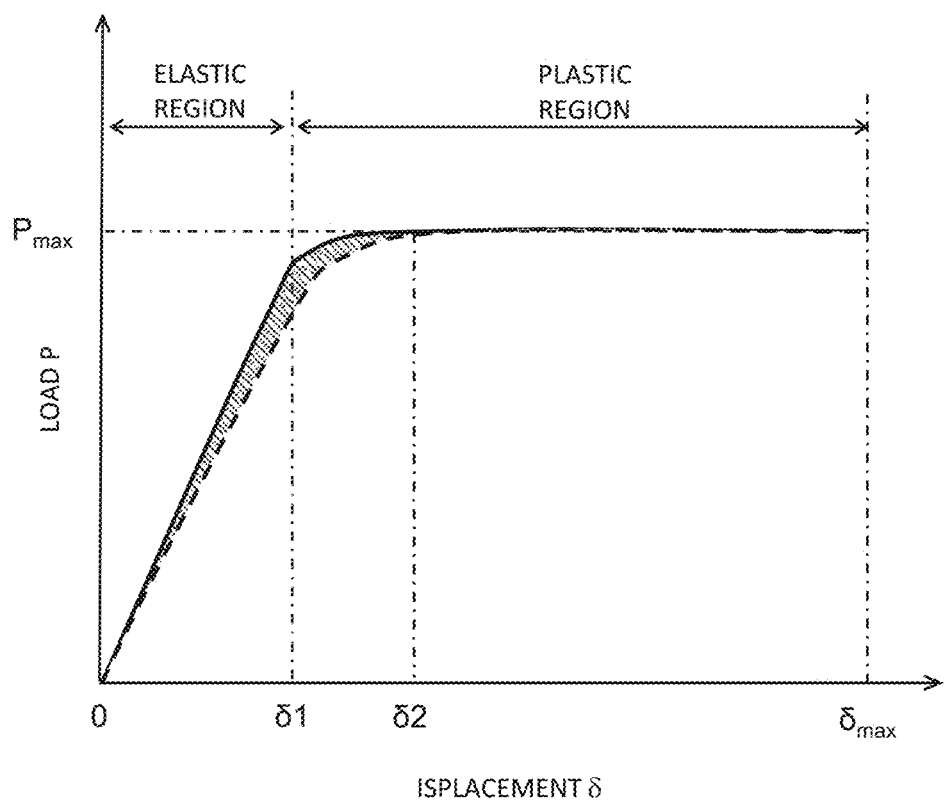
FIG. 8 is a graph showing a relation between a load on the cross tube shown in FIG. 1 and the displacement of an attached portion.

FIG. 8 shows a relation between the load P and the displacement δ of the attached portion 35 in FIGS. 7A to 7C. In a graph of FIG. 8, a vertical axis indicates the load P, and a horizontal axis indicates the displacement δ. In addition, a broken line indicates a relation between the load P and the displacement δ in a conventional landing gear in which the stiffening portion 40 is not attached, and a solid line indicates a relation between the load P and the displacement δ in the landing gear 10 according to the present embodiment in which the stiffening portion 40 is attached.

According to the conventional landing gear shown by the broken line in FIG. 8, as the load P increases, the displacement δ of the attached portion 35 also increases substantially linearly. While the displacement δ increases from 0 to δ1 ($0 \leq \delta < \delta 1$), the cross tube 30 elastically deforms in an elastic region. After that, when the displacement δ is δ1 or more ($\delta \geq \delta 1$), the cross tube 30 plastically deforms in a plastic region. In the plastic region, when the displacement $\delta$ is $\delta 2$, the load P reaches a maximum load P max. Then, when the displacement $\delta$ becomes the maximum displacement $\delta$ max by the deformation of the cross tube 30, the middle portion 32 of the cross tube 30 is brought into contact with the ground.

On the other hand, according to the landing gear 10 of the present embodiment shown by the solid line of FIG. 8, when the displacement $\delta$ of the attached portion 35 is between 0 and $\delta 2$ ($0 \leq \delta < \delta 2$), the load P increases in accordance with an increase in the displacement $\delta$. With this, absorbed energy E of the landing gear 10 with respect to the impact generated when the landing gear 10 lands as shown by Formula 1 below becomes larger than that of the conventional landing gear by a range which is a difference between the solid line and the broken line in FIG. 8 and shown by hatching. Moreover, when the displacement $\delta$ is $\delta 2$ or more ($\delta \geq \delta 2$), the cross tube 30 is prevented from buckling. Therefore, the landing gear 10 absorbs further large landing energy, and therefore, the safety at the time of the landing can be improved.

Formula 1

$$E = \int_0^{\delta\,max} P(\delta) \cdot d\delta \quad (1)$$

The side portion 33 is supported by the stiffening portion 40, and this limits the flattening of the side portion 33. Therefore, downward bending of the middle portion 32 sandwiched between the pair of side portions 33 is reduced. With this, in the elastic region of $0 \leq \delta < \delta 1$, the rigidity of the cross tube 30 in the elastic region improves, and the inclination of the increasing load P with respect to the increase in the displacement $\delta$ becomes larger than that of the conventional landing gear. Thus, a spring constant k [N/m] of the cross tube 30 changes, and this changes a natural frequency Fn of the cross tube 30 represented by Formula 2 below. Therefore, the ground resonance when the landing gear 10 lands can be avoided, and the safety at the time of the landing can be improved.

Formula 2

$$Fn = \frac{1}{2\pi}\sqrt{\frac{k}{m}} \quad (2)$$

Even if the stiffening portion 40 does not achieve the function of supporting the cross tube 30 due to damage or the like, the shape of the landing gear 10 is the same as that of the conventional landing gear. Therefore, the landing gear 10 can maintain the landing energy absorbability, determined by the absorbed energy E and maximum load P max, at the same level as the conventional landing gear.

Moreover, the safety at the time of the landing can be improved without requiring the significantly design change of the landing gear 10.

To be specific, according to existing design procedures, the pipe materials and pipe outer diameters of the cross tubes 30, the positions (coordinates) of the attached portions 35, and the positions (coordinates) of the skids 20 are determined at a design initial stage. A method of adjusting characteristics thereafter is restricted by an increase or decrease in thickness of the cross tube 30.

For example, when the thickness of the cross tube 30 increases, the rigidity (spring constant) of the cross tube 30 in the elastic region increases, and the absorbability of the cross tube 30 that absorbs the landing energy changes. The total amount of absorbed energy tends to increase, and the maximum load increases. Therefore, the strength of the airframe 12 needs to be reconsidered, and in order to obtain, for example, desired absorbed energy at the time of the landing, the significant design change of the landing gear is required.

In contrast, when the thickness of the cross tube 30 decreases, the rigidity (spring constant) of the cross tube 30 in the elastic region decreases, and the absorbability of the cross tube 30 that absorbs the landing energy changes. The total amount of absorbed energy tends to decrease. Moreover, by the decrease in thickness, the buckling of the cross tube 30 occurs before the displacement $\delta$ becomes the maximum displacement $\delta$ max, and the total amount of absorbed energy may further decrease. With this, the total amount of absorbed energy falls below a required lower limit. Thus, the design initial stage needs to be reconsidered, and the significant design change of the landing gear is required.

Moreover, one example of a method of improving the safety other than the method of changing the thickness of the cross tube 30 may be a method of attaching a damper to the attached portion 35. This case also requires the significant design change of the landing gear.

In contrast, according to the cross tube 30 that is equivalent to the four-point bent beam model, when the moment is the same, by Brazier effect, as the curvature decreases, the bending increases, and the rigidity decreases. Therefore, when the stiffening portion 40 which restricts oval deformation (flattening) is attached to the curved pipe part 37 at which the moment is large and the curvature is small, the rigidity related to the occurrence of the ground resonance can be improved. As shown in FIG. 8, the rigidity of the cross tube 30 increases without increasing the maximum load P max 0 and decreasing the amount of absorption of the energy. Therefore, the safety at the time of the landing can be improved without requiring the significant design change of the landing gear 10.

Embodiment 2

Figure 9A:
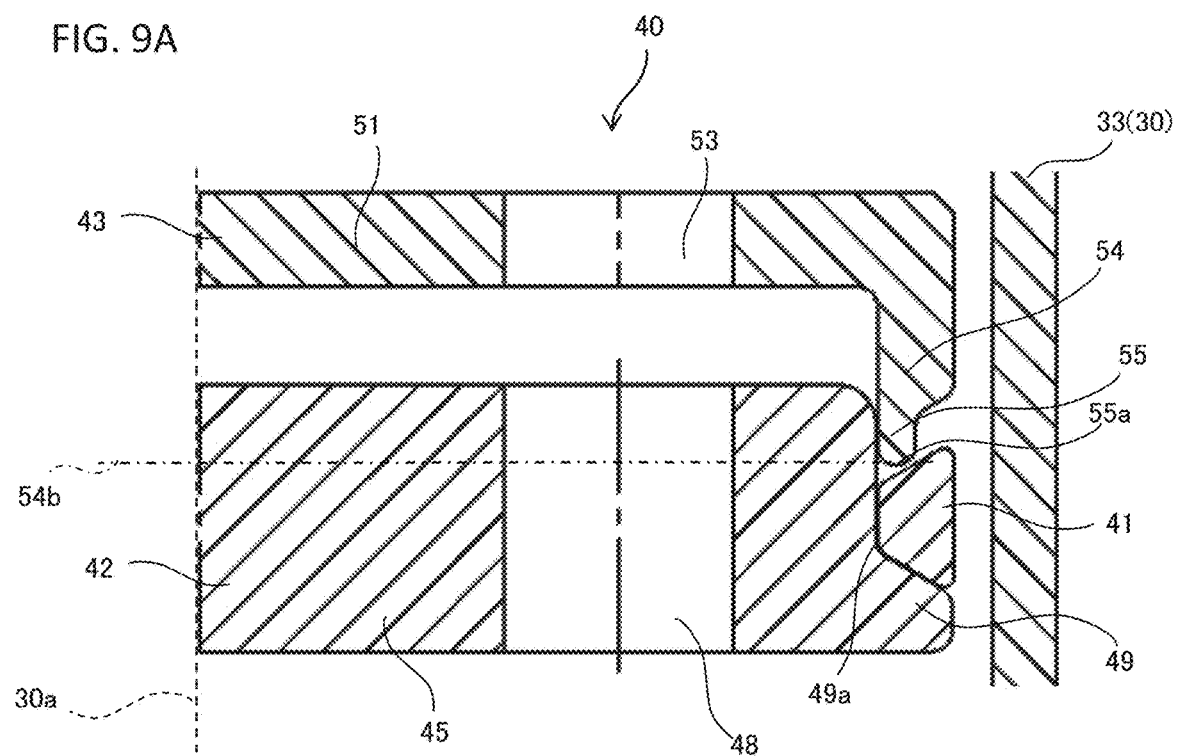
FIGS. 9A and 9B are cross-sectional views schematically showing part of landing gear according to another embodiment of the present disclosure.
Figure 9B:
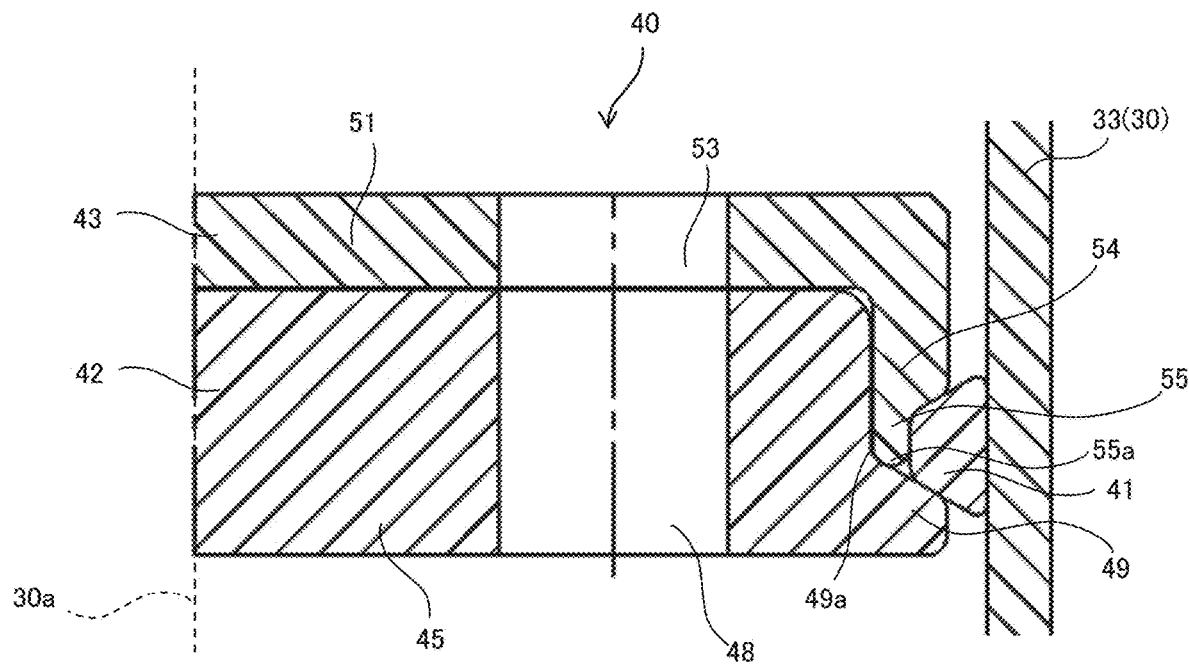

As shown in FIGS. 9A and 9B, in the landing gear 10 according to Embodiment 2, the second engaging portion 54 of the second disc 43 is externally fitted to the first disc 42 and includes a projection 55 which is fitted in a gap between the outer side surface of the first disc 42 and the inner peripheral surface of the ring 41 to increase the diameter of the ring 41. It should be noted that FIGS. 9A and 9B show part of the stiffening portion 40 and part of the cross tube 30, and the other parts are omitted. Moreover, in FIGS. 9A and 9B, the cross tube 30 having a linear pipe shape is shown, but the same is true even when the cross tube 30 has a curved pipe shape.

The projection 55 extends from the second engaging portion 54 along a direction in which the second engaging portion 54 extends. The projection 55 has a cylindrical shape. An inner diameter of the projection 55 is equal to the inner diameter of the second engaging portion 54 having a cylindrical shape. The projection 55 is provided coaxially with the second engaging portion 54 such that an inner peripheral surface of the projection 55 is flush with an inner peripheral surface of the second engaging portion 54. Since an outer diameter of the projection 55 is smaller than an outer diameter of the second engaging portion 54, the thickness of the projection 55 in a radial direction is smaller than that of the second engaging portion 54.

The inner peripheral surface and outer peripheral surface of the projection 55 are parallel to each other. A tip end 55a of the projection 55 is formed by a curved surface that curves between the inner peripheral surface and outer peripheral surface of the projection 55. In this case, the second engaging portion 54 has such a shape that: the flat surface portion 51 and a virtual plane 55b formed by the tip end 55a are perpendicular to the central axis 30a of the cross tube 30: and the outer side surface of the second engaging portion 54 is parallel to the central axis 30a of the cross tube 30.

As shown in FIG. 9A, by using the second disc 43 including the projection 55, the stiffening portion 40 is arranged at the side portion 33 of the cross tube 30. In this case, when the wires 60 are fastened, the projection 55 moves downward along the outer side surface of the main body 45 of the first disc 42 and is inserted between the inner peripheral surface of the ring 41 and the outer side surface of the main body 45. With this, the ring 41 increases in diameter, and therefore, the outer peripheral surface of the ring 41 is brought into contact with the inner surface of the side portion 33.

Since the projection 55 is interposed between the inner peripheral surface of the ring 41 and the outer side surface of the main body 45, the second disc 43 is prevented from separating from the first disc 42, and the stiffening portion 40 is fixed to the side portion 33. Therefore, the stiffening portion 40 does not have to be fixed with, for example, the bolts at the second support tool 64 shown in FIG. 5. It should be noted that the stiffening portion 40 may be fixed with, for example, the bolts at the second support tool 64.

According to the landing gear 10 of Embodiment 2, the ground resonance can be avoided by increasing the rigidity of the cross tube 30, and the large landing energy can be absorbed by preventing the cross tube 30 from buckling. Moreover, since the landing gear 10 of Embodiment 2 includes components that are the same as the components of the landing gear 10 according to Embodiment 1, the landing gear 10 of Embodiment 2 can achieve the same actions and effects as the landing gear 10 of Embodiment 1.

Embodiment 3

Figure 10:
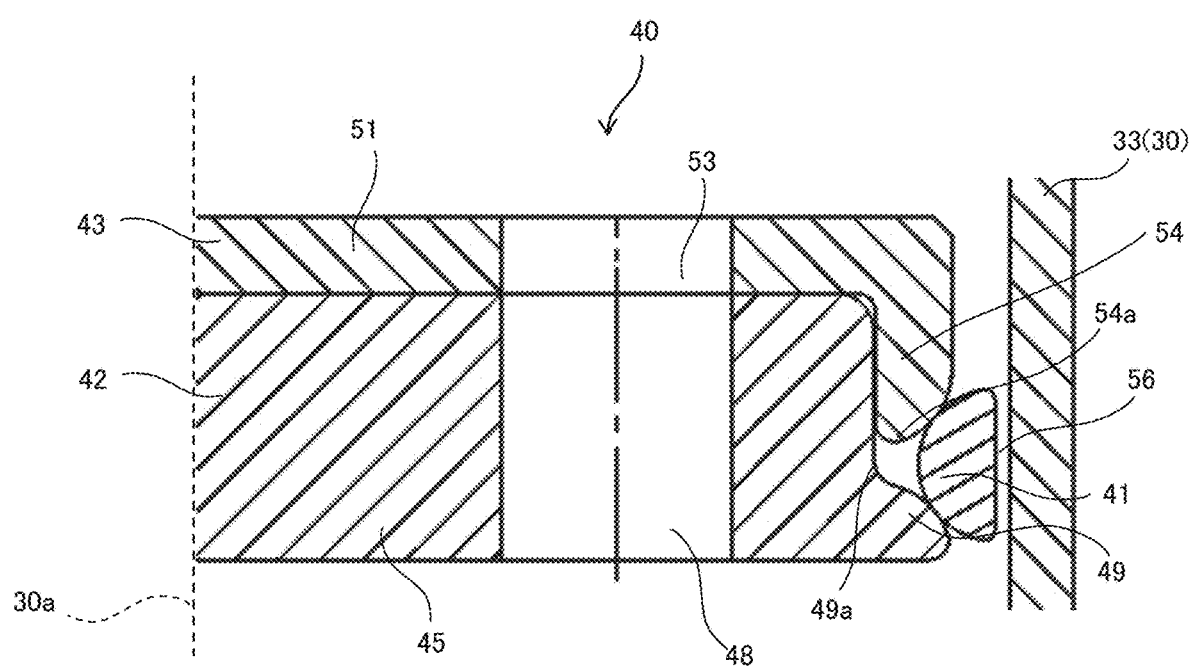
FIG. 10 is a diagram schematically showing part of landing gear according to another embodiment of the present disclosure.

As shown in FIG. 10, in the landing gear 10 according to Embodiment 3, the stiffening portion 40 may be arranged such that a gap 56 is formed between the stiffening portion 40 and the inner surface of the cross tube 30 when the landing load or the like is not being applied to the cross tube 30 (no-load state). It should be noted that FIG. 10 shows part of the stiffening portion 40 and part of the cross tube 30, and the other parts are omitted. Moreover, in FIG. 10, the cross tube 30 having a linear pipe shape is shown, but the same is true even when the cross tube 30 has a curved pipe shape.

When the landing load or the like is not being applied to the cross tube 30 (no-load state), the cross tube 30 is not being flattened. In this state, the stiffening portion 40 in which the first upper surface is in contact with the second lower surface is formed such that the gap 56 is formed between the ring 41 and the inner surface of the cross tube 30.

Figure 11:
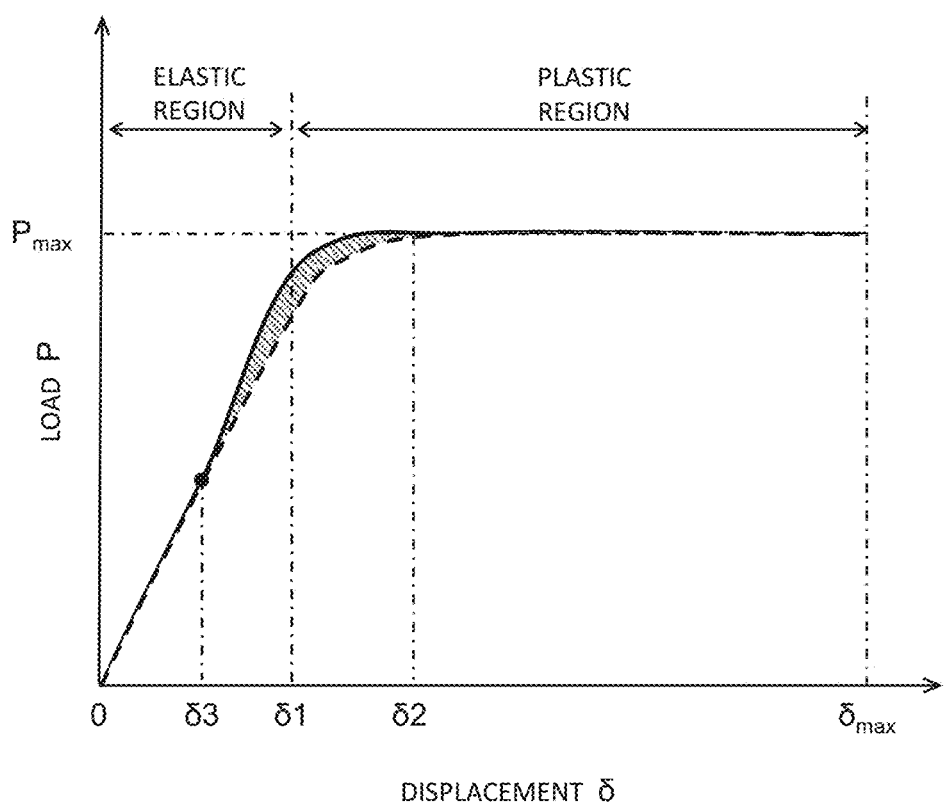
FIG. 11 is a graph showing a relation between a load on the cross tube shown in FIG. 10 and the displacement of the attached portion.

When the cross tube 30 is flattened by the load generated at the time of the landing, the ring 41 is brought into contact with the inner surface of the cross tube 30. With this, the stiffening portion 40 prevents the cross tube 30 from being flattened. Therefore, as shown in FIG. 11, on a curve (load-displacement curve) showing a relation between the load and the displacement of the attached portion 35, an inflection point is generated at 83. The gap 56 may be set such that the inflection point is formed at displacement smaller than displacement when the cross tube 30 buckles.

For example, as shown by a solid line in FIG. 11, the inflection point when the displacement $\delta$ is $\delta 3$ is provided at the displacement (elastic region; $0 \leq \delta < \delta 1$) included in an elastic deformation position of the side portion 33. Therefore, in the region of $0 \leq \delta < \delta 3$, the stiffening portion 40 is not in contact with the inner surface of the cross tube 30 and does not suppress the flattening of the cross tube 30. Therefore, in this region, the load-displacement curve (shown by the solid line) of the landing gear 10 to which the stiffening portion 40 is attached coincides with or substantially coincides with the load-displacement curve (shown by the broken line) of the conventional landing gear to which the stiffening portion 40 is not attached.

On the other hand, in the region of $\delta 3 < \delta < \delta 2$, the load P with respect to the displacement $\delta$ of the landing gear 10 shown by the solid line becomes larger than the load P with respect to the displacement $\delta$ of the landing gear 10 shown by the broken line. By such nonlinear behavior, the absorbed energy E (shown by Formula 1) of the landing gear 10 with respect to the impact generated when the landing gear 10 lands increases by a range shown by hatching in FIG. 11.

In the elastic region of $\delta 3 < \delta < \delta 1$, the rigidity of the cross tube 30 is improved by attaching the stiffening portion 40 to the landing gear 10. With this, the spring constant k [N/m] of the cross tube 30 changes, and this changes the natural frequency Fn of the cross tube 30 in Formula 2 above. Therefore, the ground resonance when the landing gear 10 lands can be avoided.

As above, in the landing gear 10 according to Embodiment 3, the ground resonance can be avoided while absorbing the large landing energy. Moreover, since the landing gear 10 according to Embodiment 3 includes components that are the same as the components of the landing gear 10 according to Embodiment 1, the landing gear 10 according to Embodiment 3 can achieve the same actions and effects as the landing gear 10 according to Embodiment 1.

It should be noted that the inflection point may be provided in the plastic region ($\delta 1 \leq \delta < \delta$ max) of the load-displacement curve. In this case, a decrease in the absorption of the landing energy at the time of the landing can be reduced by preventing the cross tube 30 from buckling, and the safety at the time of the landing can be improved by the stiffening portion 40.

Figure 12:
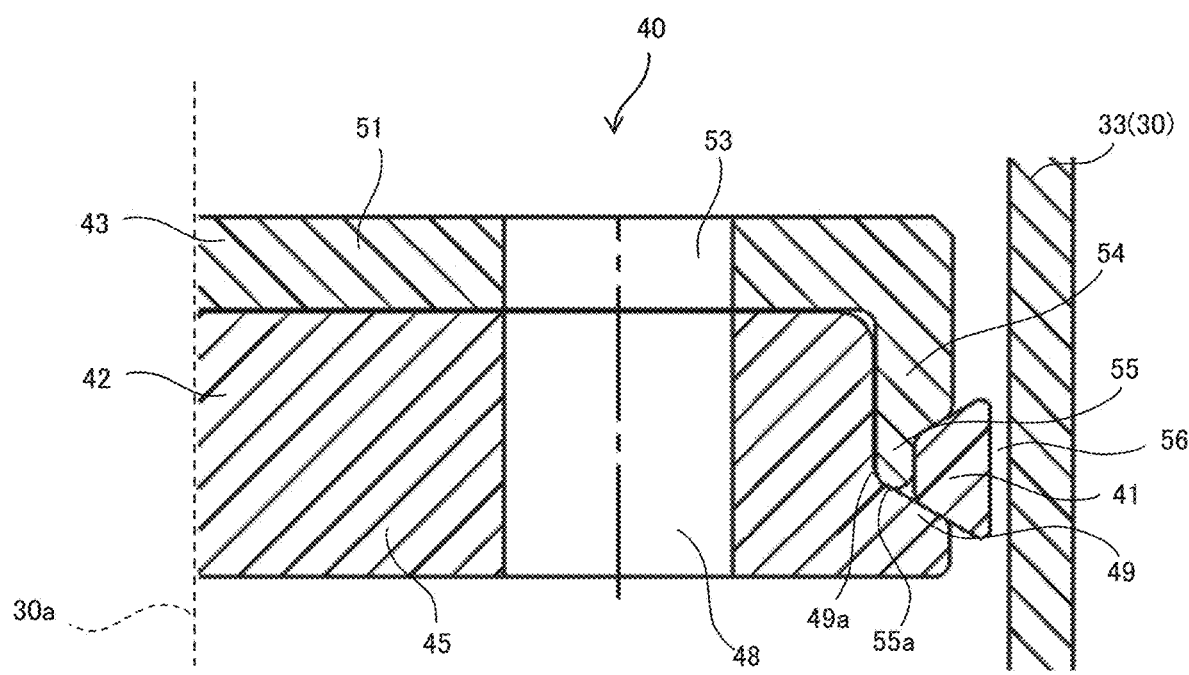
FIG. 12 is a diagram schematically showing part of the landing gear according to modified example of the landing gear shown in FIG. 10.

As shown in FIG. 12, the second engaging portion 54 of the second disc 43 is externally fitted to the first disc 42 and includes the projection 55 which is fitted in the gap between the outer side surface of the first disc 42 and the inner peripheral surface of the ring 41 to increase the diameter of the ring 41. Since the projection 55 is the same as the projection 55 according to Embodiment 2, an explanation thereof is omitted. It should be noted that FIG. 12 shows part of the stiffening portion 40 and part of the cross tube 30, and the other parts are omitted. Moreover, in FIG. 12, the cross tube 30 having a linear pipe shape is shown, but the same is true even when the cross tube 30 has a curved pipe shape.

Embodiment 4

In the landing gear 10 according to Embodiment 4, the stiffening portion 40 is arranged in the internal space of the middle portion 32 of the cross tube 30. The middle portion 32 is a pipe part located between the pair of curved pipe parts 37. The stiffening portion 40 suppresses Brazier effect, and the decrease in the absorption of the landing energy can be reduced by preventing the buckling.

Figure 13:
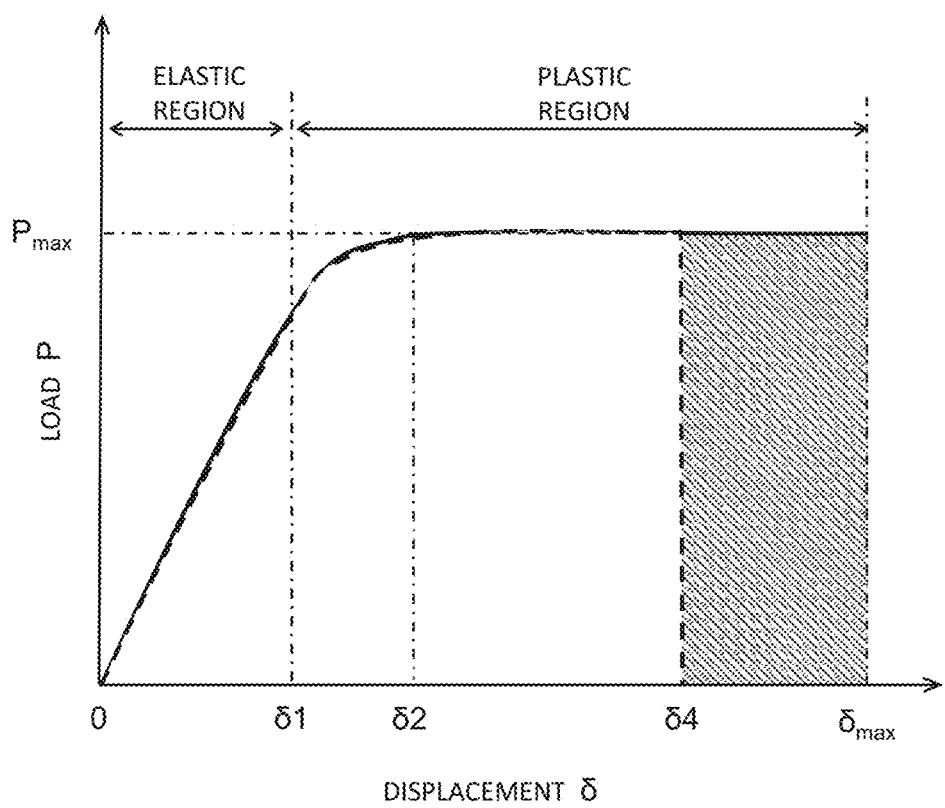
FIG. 13 is a graph showing a relation between a load on the cross tube of landing gear, according to another embodiment of the present disclosure, and the displacement of the attached portion.

To be specific, at the middle portion 32 located between the attached portions 35, the bending moment at the time of the landing is large, and therefore, the buckling tends to occur. Therefore, as shown by a broken line in a graph showing a relation between the load P and the displacement δ of the attached portion 35 in FIG. 13, when the displacement δ becomes 4, the cross tube 30 buckles and therefore cannot support the airframe 12, and the load P rapidly decreases. With this, the absorbed landing energy absorbed by the cross tube 30 decreases.

On the other hand, when the stiffening portion 40 is attached in the middle portion 32, the middle portion 32 is prevented from buckling, and therefore, the cross tube 30 can be prevented from buckling. Therefore, as shown by a solid line in FIG. 13, even when the displacement δ is δ4 or more (δ≥δ4), the cross tube 30 keeps on supporting the airframe 12, and the load P acts on the attached portion 35. Then, the load P gradually decreases as the displacement δ increases, and when the displacement δ becomes the maximum displacement δ max, the middle portion 32 of the cross tube 30 is brought into contact with the ground. As a result, the absorbed energy E of the landing gear 10 shown by Formula 1 increases by the range shown by hatching in FIG. 11.

As above, in the landing gear 10 according to Embodiment 4, the ground resonance can be avoided while absorbing the large landing energy. Moreover, since the landing gear 10 of Embodiment 4 includes components that are the same as the components of the landing gear 10 according to Embodiment 1, the landing gear 10 of Embodiment 4 can achieve the same actions and effects as the landing gear 10 of Embodiment 1.

Moreover, in Embodiment 4, in addition to the internal space of the middle portion 32 of the cross tube 30, the stiffening portion 40 may be arranged in at least one of the internal spaces of the pipe parts that are the curved pipe parts 37 and the pipe part located between the pair of curved pipe parts 37, as with Embodiment 1.

As with Embodiment 4, the stiffening portion 40 including the projection 55 according to Embodiment 2 may be arranged in the internal space of the middle portion 32 of the cross tube 30. Moreover, as with Embodiment 4, the stiffening portion 40 arranged such that the gap 56 is formed between the stiffening portion 40 and the inner surface of the cross tube 30 when the landing load or the like is not being applied to the cross tube 30 (no-load state) in Embodiment 3 may be arranged in the internal space of the middle portion 32 of the cross tube 30. Even in these cases, the ground resonance can be avoided while absorbing the large landing energy.

Other Embodiment

According to each of the landing gears 10 of the above embodiments, the shapes of the first disc 42 and the second disc 43 are changed in accordance with the shape of the cross tube 30 in which the stiffening portion 40 is arranged. However, the shapes of the first disc 42 and the second disc 43 are not limited to those as long as the stiffening portion 40 is arranged in at least one of the internal spaces of the pipe parts that are the curved pipe parts 37 and the pipe part located between the pair of curved pipe parts 37, and the flattening of the cross tube 30 is suppressed.

Figure 14A:
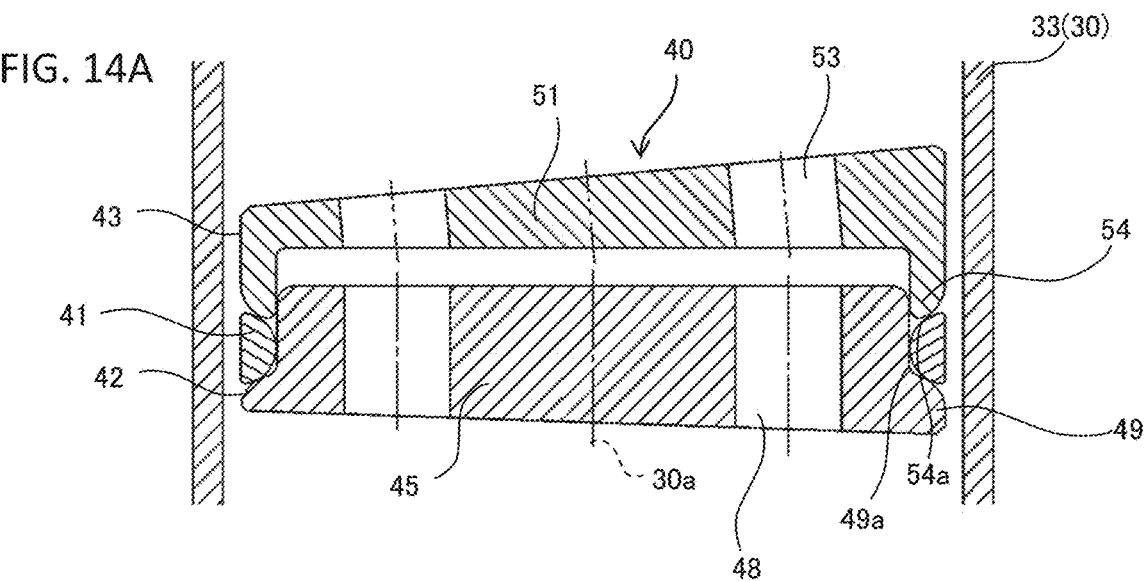
FIGS. 14A to 14C are cross-sectional views schematically showing part of landing gear according to another embodiment of the present disclosure.
Figure 14B:
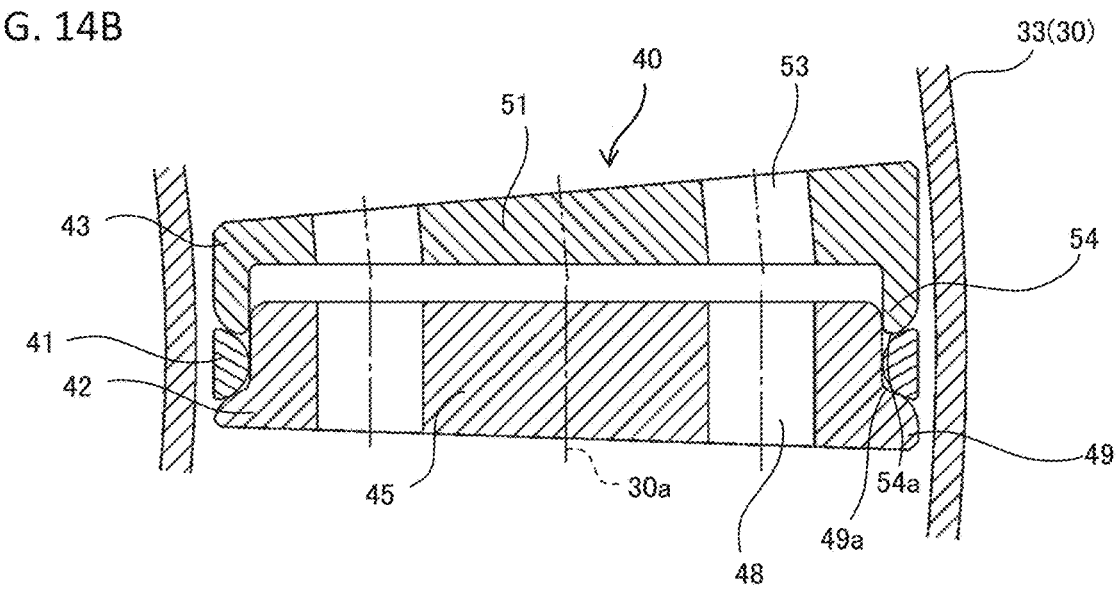
Figure 14C:
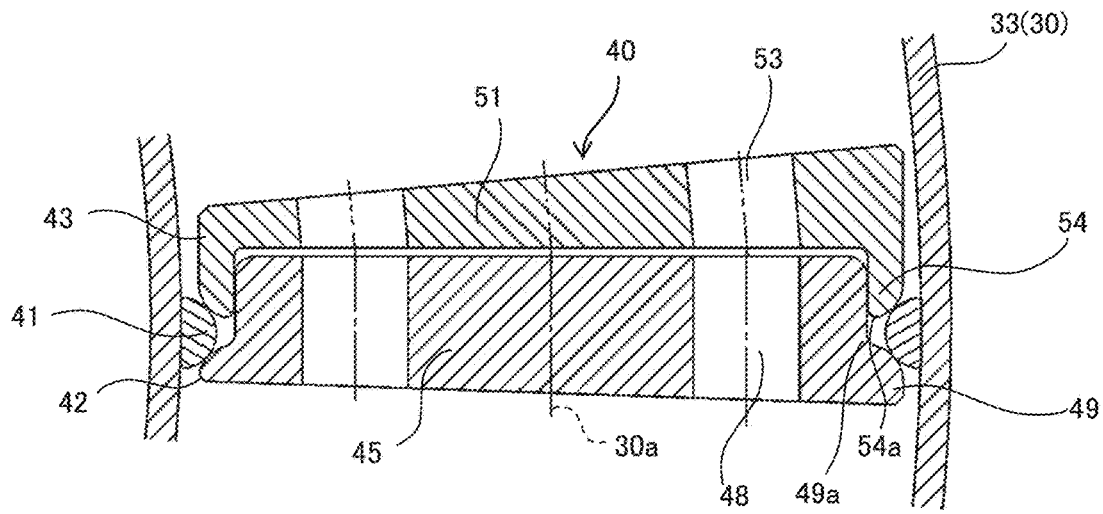

For example, the stiffening portions 40 having the same shapes may be arranged at the linear pipe part 36 of FIG. 14A and the curved pipe part 37 of FIG. 14B in the cross tube 30. In this case, as shown in FIG. 14C, the stiffening portion 40 has such a shape that in a fixed state in which the first upper surface of the first disc 42 and the second lower surface of the second disc 43 are in contact with each other, the first lower surface of the first disc 42 and the second upper surface of the second disc 43 are perpendicular to the central axis 30a of the cross tube 30. The dimension of the stiffening portion 40 is set such that when the stiffening portion 40 is inserted into and passes through the cross tube 30, the stiffening portion 40 does not interfere with the cross tube 30.

Figure 15:
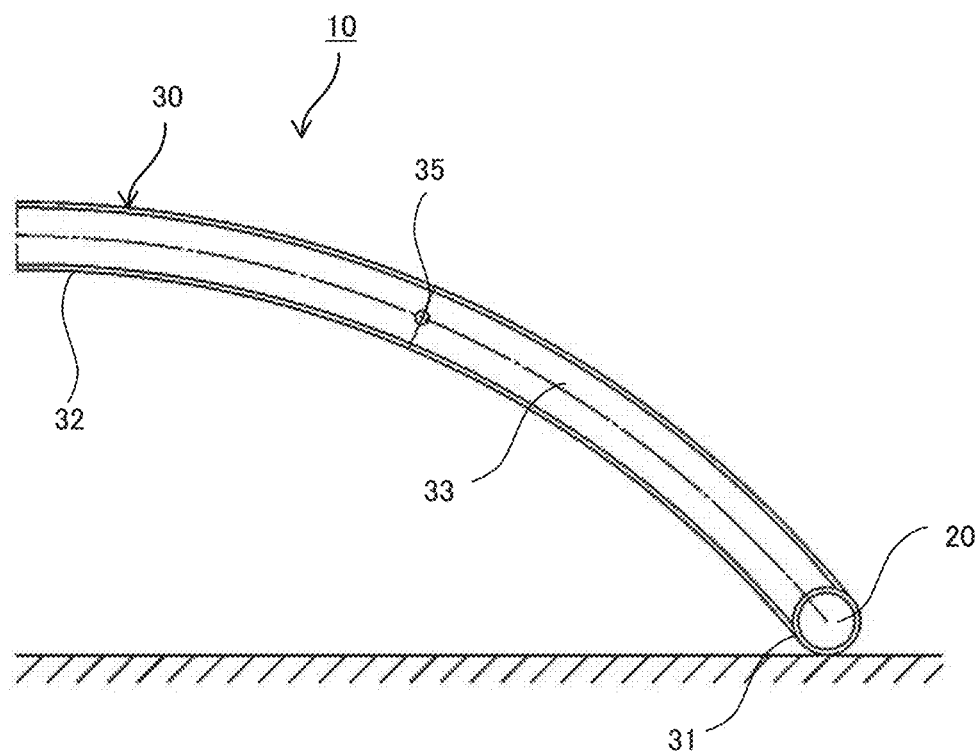
FIG. 15 is a diagram schematically showing part of the cross tube to which the landing gear according to yet another embodiment is attached.

In each of the landing gears 10 according to the above embodiments, the cross tube 30 is formed by the linear pipe parts 36 and the curved pipe parts 37. However, the shape of the cross tube 30 is not limited to this. For example, as shown in FIG. 15, the stiffening portion 40 may be arranged in the cross tube 30 formed by the curved pipe part.

Even in this case, when the stiffening portion 40 is arranged in the curved pipe part of the side portion 33 located closer to the end portion 31 then the attached portion 35, the ground resonance can be avoided by the change in the rigidity. Moreover, when the stiffening portion 40 is arranged at the curved pipe part of the middle portion 32 located between the pair of attached portions 35, the decrease in the absorption of the landing energy at the time of the landing can be reduced by preventing the buckling. As above, the safety at the time of the landing can be improved by the stiffening portion 40.

In each of the landing gears 10 according to the above embodiments, the stiffening portion 40 is the stiffening member which is detachably attached to the cross tube 30 and is provided separately from the cross tube 30. However, the stiffening portion 40 may be fixed to the cross tube 30 so as not to be detachable from the cross tube 30 and may be formed integrally with the cross tube 30.

The stiffening portion 40 according to Embodiment 1 may be provided in at least one of the pipe parts that are the side portions 33 and the middle portion 32. Moreover, the stiffening portion 40 including the projection 55 according to Embodiment 2 may be provided in at least one of the pipe parts that are the side portions 33 and the middle portion 32. Furthermore, the stiffening portion 40 arranged such that the gap 56 is formed between the stiffening portion 40 and the inner surface of the cross tube 30 when the landing load or the like is not being applied to the cross tube 30 (no-load state) in Embodiment 3 may be provided in at least one of the pipe parts that are the side portions 33 and the middle portion 32. Even in these cases, the ground resonance can be avoided while absorbing the large landing energy.

The above embodiments may be combined with each other as long as they do not exclude from each other. From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

The landing gear and stiffening member of the present disclosure are useful as, for example, a landing gear and stiffening member which can avoid ground resonance while absorbing large landing energy. Devices in accordance with the present disclosure are designed to solve this problem, and an object of the present disclosure is to provide a landing gear and stiffening member which can avoid ground resonance while absorbing large landing energy.

According to configurations of the present disclosure, the stiffening portion arranged in the pipe part suppresses flattening of the cross tube. The rigidity of the cross tube is increased to a value by the positions of the stiffening portions in the cross tube, the number of stiffening portions, and contact states of the stiffening portions with the inner surface of the cross tube. Therefore, the ground resonance can be avoided. Moreover, even at the time of the landing at a high landing speed, large landing energy can be absorbed by preventing buckling and collapsing of the cross tube.

REFERENCE CHARACTERS

L front-rear axis
P load
10 landing gear
11 rotary wing aircraft
12 airframe
20 skid
30 cross tube
30a central axis
31 end portion
32 middle portion
33 side portion
34 extending portion
35 attached portion
36 linear pipe part
37 curved pipe part
40 stiffening portion (stiffening member)
41 ring
42 first disc
43 second disc
44 cut portion
45 main body
48 first through hole
49 first engaging portion
49a upper end
49b virtual plane
51 flat surface portion
53 second through hole
54 second engaging portion
54a tip end
54b virtual plane
55 projection
55a tip end
55b virtual plane
56 gap
60 wire
61 first support tool
62 first insertion hole
63 first terminal fitting
64 second support tool
65 second insertion hole
66 second terminal fitting
67 nut
68 third through hole

The invention claimed is:

1. A landing gear, comprising:
a pair of skids arranged in parallel with a front-rear axis of an airframe of a rotary wing aircraft;
a cross tube attached to the airframe and coupling the pair of skids to each other; and
a stiffening portion configured to suppress flattening of the cross tube, wherein the cross tube includes an internal space and curved portions that are located closer to corresponding end portions of the cross tube than to corresponding attached portions of the cross tube, the attached portions being attached to the airframe, the stiffening portion is arranged in at least one of internal spaces of stiffened portions that are the curved portions or an internal space of a stiffened portion located between a pair of curved portions, and the stiffening portion includes
an enlarged diameter portion which increases in diameter, in a direction orthogonal to an axial direction of the cross tube, by axial fastening power acting in the axial direction of the cross tube and is brought into contact with an inner surface of the stiffened portion, and
a fastening portion configured to generate the axial fastening power with respect to the enlarged diameter portion.

2. The landing gear according to claim 1, wherein the enlarged diameter portion and the inner surface of the stiffened portion are in contact with each other in a no-load state.

3. The landing gear according to claim 1, wherein
the enlarged diameter portion is arranged such that a gap is formed between the enlarged diameter portion and the inner surface of the stiffened portion in a no-load state, and
the gap is set such that when the inner surface of the stiffened portion flattened by a load at the time of landing is brought into contact with the enlarged diameter portion, an inflection point of a curve showing a relation between the load and displacement of the attached portion is formed at displacement smaller than displacement when the stiffened portion buckles.

4. The landing gear according to claim 3, wherein the gap is set such that the inflection point is formed at the displacement included in an elastic deformation position of the stiffened portion.

5. The landing gear according to claim 1, wherein
the enlarged diameter portion includes:
a ring capable of increasing in diameter and configured to increase in diameter to be brought into contact with the inner surface of the stiffened portion; and
a first disc and second disc internally fitted to the ring and configured to sandwich the ring in the axial direction,
the fastening portion includes a wire configured to generate the axial fastening power with respect to the first disc and the second disc,
the first disc includes a first engaging portion which is brought into contact with the ring to restrict the displacement of the ring toward one side in the axial direction and increase the diameter of the ring, and
the second disc includes a second engaging portion which is brought into contact with the ring to restrict the displacement of the ring toward the other side in the axial direction and increase the diameter of the ring.

6. The landing gear according to claim 5, wherein the second engaging portion includes a projection which is fitted in a gap between an outer side surface of the first disc and an inner peripheral surface of the ring to increase the diameter of the ring.

7. A stiffening member for use in a landing gear that includes a pair of skids arranged in parallel with a front-rear axis of an airframe of a rotary wing aircraft, and a cross tube attached to the airframe and coupling the pair of skids to each other, the cross tube including an internal space, wherein the stiffening member is arranged in at least one of internal spaces of stiffened portions that are curved portions or an internal space a stiffened portion located between a pair of curved portions, the curved portions being located closer to corresponding end portions of the cross tube than corresponding attached portions of the cross tube, the attached portions being attached to the airframe, the stiffening member comprising:

an enlarged diameter portion which increases in diameter, in a direction orthogonal to an axial direction of the cross tube, by axial fastening power acting in the axial direction of the cross tube and is brought into contact with an inner surface of the stiffened portion; and a fastening portion configured to generate the axial fastening power with respect to the enlarged diameter portion.

8. The stiffening member according to claim 7, wherein the enlarged diameter portion and the inner surface of the stiffened portion are in contact with each other in a no-load state.

9. The stiffening member according to claim 7, wherein the enlarged diameter portion includes:

a ring capable of increasing in diameter and configured to increase in diameter to be brought into contact with the inner surface of the stiffened portion; and a first disc and second disc internally fitted to the ring and configured to sandwich the ring in the axial direction, the fastening portion includes a wire configured to generate the axial fastening power with respect to the first disc and the second disc, the first disc includes a first engaging portion which is brought into contact with the ring to restrict the displacement of the ring toward one side in the axial direction and increase the diameter of the ring, and the second disc includes a second engaging portion which is brought into contact with the ring to restrict the displacement of the ring toward the other side in the axial direction and increase the diameter of the ring.

10. The stiffening member according to claim 9, wherein the second engaging portion includes a projection which is fitted in a gap between an outer side surface of the first disc and an inner peripheral surface of the ring to increase the diameter of the ring.

11. The stiffening member according to claim 7, wherein the enlarged diameter portion is arranged such that a gap is formed between the enlarged diameter portion and the inner surface of the stiffened portion in a no-load state, and the gap is set such that when the inner surface of the stiffened portion flattened by a load at the time of landing is brought into contact with the enlarged diameter portion, an inflection point of a curve showing a relation between the load and displacement of the attached portion is formed at displacement smaller than displacement when the stiffened portion buckles.

12. The stiffening member according to claim 11, wherein the gap is set such that the inflection point is formed at the displacement included in an elastic deformation position of the stiffened portion.

13. A landing gear, comprising:
a pair of skids arranged in parallel with a front-rear axis of an airframe;
a cross tube attached to the airframe, the cross tube coupling the pair of skids to each other; and a stiffening portion configured to suppress flattening of the cross tube, wherein the cross tube includes end portions, attached portions that are attached to the airframe, and curved portions that are located closer to corresponding end portions than to the attached portions, the stiffening portion is arranged in an internal space of a curved portion of the curved portions or in an internal space of a stiffened portion located between a pair of curved portions, and the stiffening portion includes an enlarged diameter portion which increases in diameter, in a direction orthogonal to an axial direction of the cross tube, by axial fastening power acting in the axial direction of the cross tube and is brought into contact with an inner surface of the curved portion, and a fastening portion configured to generate the axial fastening power with respect to the enlarged diameter portion.

14. The landing gear according to claim 13, wherein the enlarged diameter portion and the inner surface of the stiffened portion are in contact with each other in a no-load state.

15. The landing gear according to claim 13, wherein the enlarged diameter portion is arranged such that a gap is formed between the enlarged diameter portion and the inner surface of the stiffened portion in a no-load state, and the gap is set such that when the inner surface of the stiffened portion flattened by a load at the time of landing is brought into contact with the enlarged diameter portion, an inflection point of a curve showing a relation between the load and displacement of the attached portion is formed at displacement smaller than displacement when the stiffened portion buckles.

16. The landing gear according to claim 15, wherein the gap is set such that the inflection point is formed at the displacement included in an elastic deformation position of the stiffened portion.

17. The landing gear according to claim 13, wherein
the enlarged diameter portion includes:

a ring capable of increasing in diameter and configured to increase in diameter to be brought into contact with the inner surface of the stiffened portion; and a first disc and second disc internally fitted to the ring and configured to sandwich the ring in the axial direction, the fastening portion includes a wire configured to generate the axial fastening power with respect to the first disc and the second disc, the first disc includes a first engaging portion which is brought into contact with the ring to restrict the displacement of the ring toward one side in the axial direction and increase the diameter of the ring, and the second disc includes a second engaging portion which is brought into contact with the ring to restrict the displacement of the ring toward the other side in the axial direction and increase the diameter of the ring.

18. The landing gear according to claim 17, wherein the second engaging portion includes a projection which is fitted in a gap between an outer side surface of the first disc and an inner peripheral surface of the ring to increase the diameter of the ring.

* * * * *